United States Patent
Osuga et al.

(10) Patent No.: US 12,550,830 B2
(45) Date of Patent: Feb. 17, 2026

(54) STAPLE

(71) Applicant: MAX CO., LTD., Tokyo (JP)

(72) Inventors: Satoshi Osuga, Tokyo (JP); Masatoshi Asai, Tokyo (JP)

(73) Assignee: Max Co., Ltd., Tokyo (JP)

( * ) Notice: Subject to any disclaimer, the term of this patent is extended or adjusted under 35 U.S.C. 154(b) by 158 days.

(21) Appl. No.: 18/033,068

(22) PCT Filed: Oct. 27, 2021

(86) PCT No.: PCT/JP2021/039722
§ 371 (c)(1),
(2) Date: Apr. 20, 2023

(87) PCT Pub. No.: WO2022/092172
PCT Pub. Date: May 5, 2022

(65) Prior Publication Data
US 2023/0389483 A1 Dec. 7, 2023

(30) Foreign Application Priority Data

Oct. 30, 2020 (JP) .................... 2020-183166
Oct. 8, 2021 (JP) .................... 2021-166024

(51) Int. Cl.
*A01G 9/12* (2006.01)
*A01G 17/12* (2006.01)

(52) U.S. Cl.
CPC ............. *A01G 9/128* (2013.01); *A01G 17/12* (2013.01)

(58) Field of Classification Search
CPC ........ A01G 9/128; A01G 17/12; A01G 17/08; A01G 17/10
See application file for complete search history.

(56) References Cited

U.S. PATENT DOCUMENTS 2,227,553 A * 1/1941 Paque .................... E04H 17/06
52/153
2,247,631 A * 7/1941 Gardner ................ E04H 17/124
256/57

(Continued)

FOREIGN PATENT DOCUMENTS

CA 2258727 A1 * 2/2000 ............. A01G 17/08
CN 201479672 U 5/2010

(Continued)

OTHER PUBLICATIONS

Sep. 6, 2024—(EP) Extended Search Report—App 21886289.4.

(Continued)

*Primary Examiner* — Katelyn T Truong
(74) *Attorney, Agent, or Firm* — Banner & Witcoff, Ltd.

(57) ABSTRACT

A staple including a body part that is formed from a flexible wire rod and that opens in a first direction, a first leg part that extends continuously from a first end section on one opening side of the body part, and a second leg part that extends continuously from a second end section on the other opening side of the body part, the first leg part having a first section that curves and extends outward, and a second section that curves from the first part and extends in the first direction, and the second leg part having a third section that extends in the first direction, and a fourth section that is bent outward from the tip-end part of the third section, the third section being longer than the second section.

13 Claims, 24 Drawing Sheets

(56) References Cited

U.S. PATENT DOCUMENTS

| | | | | |
|---|---|---|---|---|
| 5,275,383 A | * | 1/1994 | Wick | E04H 17/268 |
| | | | | 256/57 |
| 5,590,592 A | | 1/1997 | Irvin | |
| 5,913,341 A | * | 6/1999 | Jones | E04G 21/123 |
| | | | | 52/750 |
| 6,254,049 B1 | | 7/2001 | Goehly | |

FOREIGN PATENT DOCUMENTS

| | | | | |
|---|---|---|---|---|
| CN | 105532366 A | * | 5/2016 | |
| CN | 206674628 U | | 11/2017 | |
| DE | 802114 C | * | 2/1951 | |
| DE | 1165335 B | | 3/1964 | |
| EP | 0338801 A2 | | 10/1989 | |
| EP | 1839482 B1 | | 10/2007 | |
| FR | 2135862 A5 | * | 12/1972 | |
| FR | 2743980 A1 | * | 8/1997 | A01G 17/08 |
| GB | 853558 A | | 11/1960 | |
| JP | H01-317337 A | | 12/1989 | |
| JP | H05-163797 A | | 6/1993 | |
| JP | H05-74245 U | | 10/1993 | |
| JP | 3051896 U | | 9/1998 | |
| JP | 2010-246415 A | | 11/2010 | |
| JP | 2013102705 A | | 5/2013 | |
| KR | 100681872 B1 | | 2/2007 | |
| KR | 20100089998 A | | 8/2010 | |
| KR | 20160109231 A | * | 9/2016 | |
| KR | 20160110330 A | | 9/2016 | |

OTHER PUBLICATIONS

International Search Report (PCT/ISA/210) issued on Jan. 18, 2022, by the Japanese Patent Office as the International Searching Authority for International Application No. PCT/JP2021/039722. (9 pages).
Written Opinion (PCT/ISA/237) issued on Jan. 18, 2022, by the Japanese Patent Office as the International Searching Authority for International Application No. PCT/JP2021/039722. (6 pages).
Aug. 19, 2025—(CN) Notification of First Office Action—App 202180071830.1.
Nov. 7, 2025—(AU) Examination Report No. 1—App 2025200990.

* cited by examiner

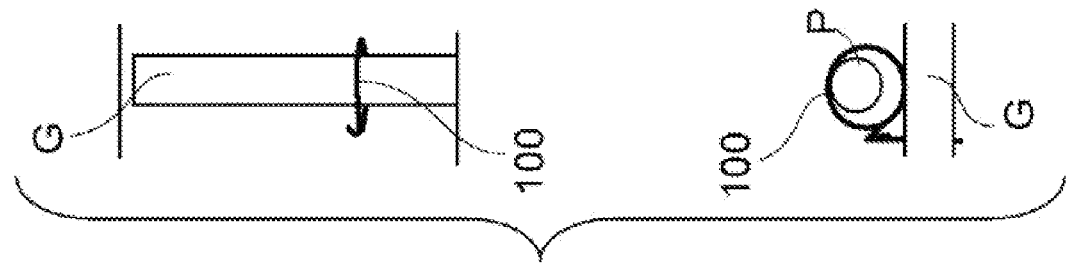
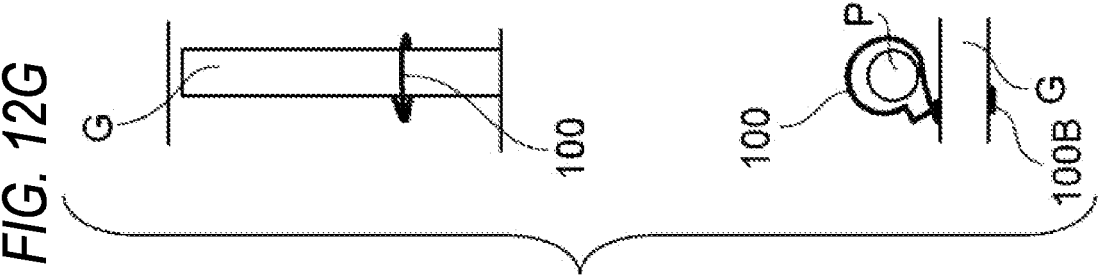
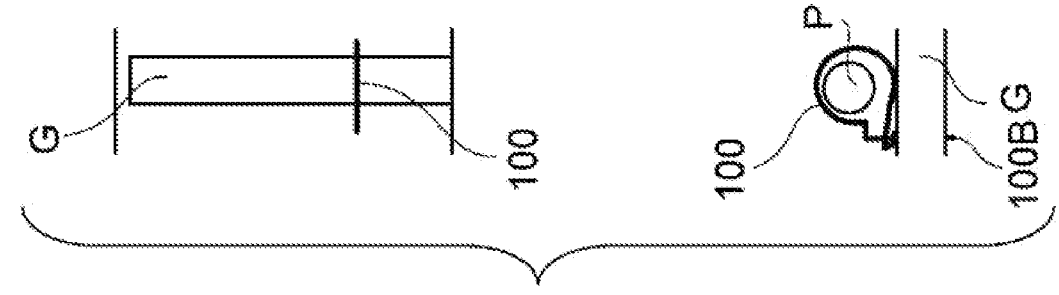

STAPLE

CROSS-REFERENCE TO RELATED APPLICATION

This application is a 35 U.S.C. 371 National Phase Entry Application from PCT/JP2021/039722, filed on Oct. 27, 2021, which claims priority from Japanese Patent Application Nos. 2020-183166 filed on Oct. 30, 2020, and 2021-166024 filed Oct. 8, 2021. Respectively, the disclosures of which are incorporated herein in their entirety by reference and priority is claimed to each of the foregoing.

TECHNICAL FIELD

The present invention relates to a staple.

BACKGROUND ART

A staple for holding a stem, a temple, or a branch of a plant or a tree on a guide element such as a wire, a beam, a string, a rod, a pipe, or a branch of a tree is known.

Patent Literature 1 discloses such a staple. The staple disclosed in the patent literature includes a pair of left and right arms and convex protrusions provided between the arms. A stem or the like may be held by a guide element by sandwiching the guide element by the convex protrusions and closing the arms so as to sandwich the stem or the like.

CITATION LIST

Patent Literature

Patent Literature 1: EP1839482B

SUMMARY OF INVENTION

Technical Problem

However, the guide element is merely sandwiched by the convex protrusions, and thus is likely to be detached from the convex protrusions.

Since the stem or the like merely holds end portions of the closed arms in a superimposed manner, the arms are easily opened, and the stem or the like is easily detached from the arms. In particular, when a stem or the like grows and becomes thick, or a fruit or the like fruited on the stem or the like grows and increases in weight, the arms are displaced in an opening direction, and the above problem easily occurs.

Therefore, an object of the present invention relates to provide a staple that is unlikely to be detached.

Solution to Problem

According to an aspect of the present disclosure, there is provided a staple capable of holding a stem, a branch, or the like of a plant on a guide element. The staple includes a main body portion opening in a first direction, a first leg portion continuously extending from a first end portion that is one of ends of the main body portion on an opening side, and a second leg portion continuously extending from a second end portion that is another of ends of the main body portion on the opening side. The first leg portion includes a first portion bent and extending outward, and a second portion bent from the first portion and extending in the first direction. The second leg portion includes a third portion extending in the first direction and a fourth portion bent outward from a distal end portion of the third portion. The third portion is longer than the second portion.

BRIEF DESCRIPTION OF DRAWINGS

FIG. 8 is a schematic diagram showing deformation of the staple accompanying growth of a stem or the like;

FIG. 12F is a schematic diagram showing a process of engaging the staple according to the modification of the embodiment with a guide element;

FIG. 12G is a schematic diagram showing a process of engaging the staple according to the modification of the embodiment with a guide element;

FIG. 12H is a schematic diagram showing a process of engaging the staple according to the modification of the embodiment with a guide element;

DESCRIPTION OF EMBODIMENTS

Hereinafter, embodiments of the present invention will be described with reference to the drawings. The following embodiments are examples for explaining the present invention, and are not intended to limit the present invention only to the embodiments.

First Embodiment

Figure 1A:
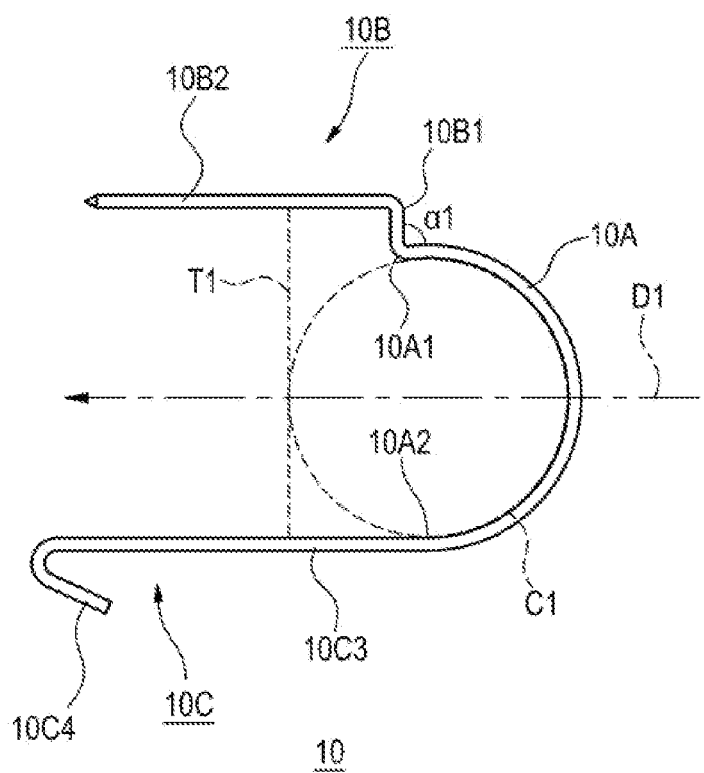
FIG. 1A is a diagram showing an example of a staple according to an embodiment.
Figure 1B:
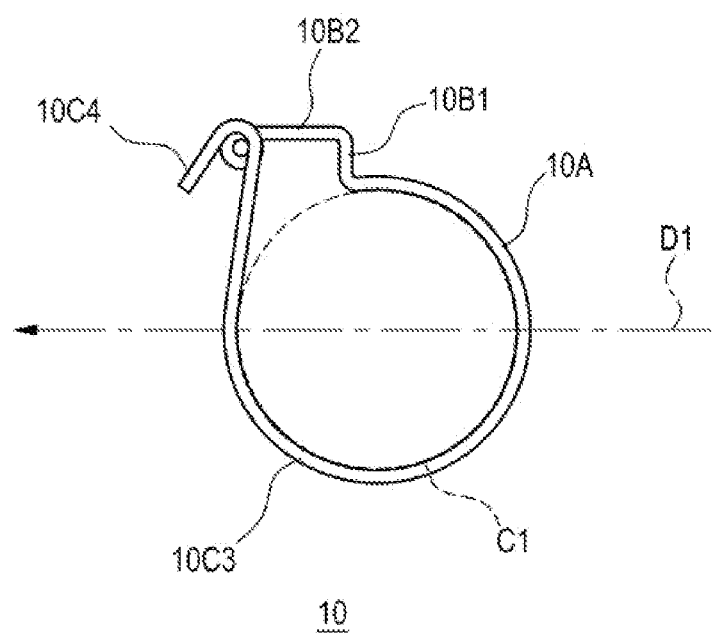
FIG. 1B is a diagram showing an example of the staple in a bound state.

FIG. 1A shows a staple 10 according to a first embodiment. FIG. 1B shows the staple 10 in a bound state. The staple 10 is formed of a wire (for example, wire of metal such as iron) having flexibility. In a state in which an object to be held such as a stem or a branch of a plant (hereinafter, referred to as "stem or the like P") is disposed in the staple 10, both end portions of the staple 10 are bent and engaged with a guide element G as shown in FIG. 1B, whereby the stem or the like P may be held by the guide element G. The wire forming the staple 10 may be a wire having flexibility as well as plasticity.

The staple 10 includes a main body portion 10A, a first leg portion 10B continuously extending from one end portion of the main body portion 10A, and a second leg portion 10C continuously extending from the other end portion.

The main body portion 10A is a portion that connects the first leg portion 10B and the second leg portion 10C and that surrounds the stem or the like P. As shown in FIG. 1B, since the first leg portion 10B and the second leg portion 10C are engaged with the same guide element G in the bound state, the stem or the like P may be disposed in a region surrounded by the main body portion 10A, the first leg portion 10B, and the second leg portion 10C. Therefore, as long as an opening for disposing the stem or the like P therein is provided, the main body portion 10A may be formed in various shapes such as a rectangle and a parallelogram in accordance with a shape of the stem or the like P. As shown in FIG. 1A, the main body portion 10A according to the present embodiment is formed to be curved in a C shape or an arc shape so as to be opened in a left direction of a paper surface. Here, a direction (left direction of the paper surface) from a closed side (right side of the paper surface) to an opened side (left side of the paper surface) of the main body portion 10A in FIG. 1A is referred to as an opening direction D1.

The first leg portion 10B and the second leg portion 10C are portions for engaging with the guide element G.

As shown in FIG. 1A, the first leg portion 10B includes a first portion 10B1 that is connected to one end portion 10A1 of the main body portion 10A and that is bent and extends outward, and a second portion 10B2 that is further bent from the first portion 10B1 and that extends in the opening direction D1.

An angle α1 between the first portion 10B1 and the main body portion 10A, that is, a bending angle is an acute angle of 90 degrees to about 90 degrees (for example, 80 degrees to 90 degrees). The second portion 10B2 includes a distal end portion for engaging with the guide element G, and an angle with the first portion 10B1, that is, a bending angle is an acute angle of 90 degrees to about 90 degrees (for example, 80 degrees to 90 degrees). By providing the first portion 10B1, the second portion 10B2 is offset outward with respect to the main body portion 10A and extends in the opening direction D1.

The first portion 10B1 may be referred to as a shoulder portion. Since the first portion 10B1 is bent about 90 degrees with respect to the main body portion 10A and extends outward, and the second portion 10B2 is bent about 90 degrees with respect to the first portion 10B1 and extends in the opening direction D1, a portion extending from one end portion of the main body portion 10A to the second portion 10B2 through the first portion 10B1 may be referred to as a crank portion.

Since the second portion 10B2 may be offset, the first portion 10B1 is preferably formed to be shorter than the second portion 10B2. The second portion 10B2 may have a length that can be engaged with the guide element G, and thus is preferably formed to be shorter than a third portion 10C3 to be described later.

The second leg portion 10C includes a third portion 10C3 that is connected to the other end portion 10A2 of the main body portion 10A and that extends in the opening direction D1, and a fourth portion 10C4 that is bent outward from a distal end portion of the third portion 10C3.

As shown in FIG. 1B, the third portion 10C3 is a portion that is bent to close the opening formed by the main body portion 10A. In a state before being bent, the third portion 10C3 extends in the opening direction D1, that is, extends substantially parallel to the second portion 10B2. Therefore, the third portion 10C3 is preferably formed to be longer than a width of the opening formed by the main body portion 10A, that is, a distance between the one end portion 10A1 and the other end portion 10A2 of the main body portion, and longer than the second portion 10B2. The maximum inscribed circle C1 inscribed in the main body portion 10A corresponds to the maximum size of the stem or the like P assumed to be held by the staple 10 without expanding the main body portion 10A. Therefore, the third portion 10C3 is preferably formed to be longer than the shortest line segment connecting two intersection points where a tangent T1 of the inscribed circle C1 intersects the second portion 10B2 and the third portion 10C3. With such a configuration, as shown in FIG. 1B, the opening may be closed by causing an end portion of the third portion 10C3 to reach the second portion 10B2 without interfering with the inscribed circle C1. The term "bent" includes not only a case of being curved to form a curve as shown in FIG. 1B but also a case of being bent.

As described above, the third portion 10C3 is preferably formed to be longer than the shortest line segment connecting two intersection points where the tangent T1 of the inscribed circle C1 intersects the second portion 10B2 and the third portion 10C3, but when ta stem or the like held by the staple 10 is smaller in diameter than the inscribed circle C1, the third portion 10C3 may be formed to be shorter than the second portion 10B2. That is, the third portion 10C3 may have a length that reaches the second portion 10B2, and may be selected to have an appropriate length according to the diameter of the stem or the like P to be held.

The fourth portion 10C4 (example of a "bent portion") is a portion that engages with the guide element G. The fourth portion 10C4 is bent outward (away from the opening) from the distal end of the third portion 10C3, and on the other hand, the third portion 10C3 is bent in a direction (inward) in which the opening is closed (FIG. 1B). Since the bent third portion 10C3 has elasticity in a direction in which the closed opening is returned to a widening original position, the fourth portion 10C4 may apply a tension to the guide element G in a direction in which the opening is widened, that is, in a direction away from the first leg portion 10B. Therefore, it is possible to prevent the staple 10 from falling off due to the bending of the guide element G. The fourth portion 10C4 is provided such that an angle (bending angle) with the third portion 10C3 is an acute angle. The angle between the fourth portion 10C4 and the third portion 10C3 is preferably smaller than the angle α1 between the first portion 10B1 and the main body portion 10A. With such a configuration, the fourth portion 10C4 may be suitably hooked on the guide element G.

[Binding Method of Staple 10 Using Binding Machine 20]

Hereinafter, a binding method of the staple 10 using a binding machine 20 will be described. FIGS. 2A to 2E are schematic diagrams showing a process of engaging the staple 10 with the guide element G using the binding machine 20. A line L1 shown in the drawing is a reference line for facilitating comparison of changes in the position of the staple 10 between the drawings. FIG. 2F is a schematic diagram showing a state in which a distal end of the second portion 10B2 of the first leg portion 10B is spirally curved as a result of advancing along a groove portion formed by a first deformation portion 20A.

The binding machine 20 includes the first deformation portion 20A (clincher portion) that curves or bends a distal end side of the first leg portion 10B (second portion 10B2) of the staple 10, a second deformation portion 20B that curves or bends the third portion 10C3 of the second leg portion 10C so as to move a distal end side of the second leg portion 10C toward the distal end side of the first leg portion 10B, and a pushing portion 20C that moves the staple 10 in the opening direction D1.

For example, when the staple 10 is moved in the opening direction D1 with respect to the first deformation portion 20A, the first deformation portion 20A may be implemented by a spiral or arc-shaped groove portion formed such that the distal end of the second portion 10B2 surrounds an outer periphery of the guide element G or advances along the outer periphery of the guide element G while drawing a spiral. Since the staple 10 has flexibility, when the staple 10 moves in the opening direction D1, the distal end of the second portion 10B2 moves in the groove portion of the first deformation portion 20A while curving and drawing a spiral. Therefore, the distal end of the first leg portion 10B of the staple 10 may be formed in a spiral shape surrounding the outer periphery of the guide element G with the guide element G as an axis by moving the staple 10 in the opening direction D1 with respect to the first deformation portion 20A in a state in which the guide element G is disposed on an axis of the spiral.

The groove portion of the first deformation portion 20A is formed in a spiral shape or an arc shape such that the distal end of the second portion 10B2 advances along the outer periphery of the guide element G while drawing a spiral, but is not necessarily limited to a groove portion having a spiral shape or an arc shape. For example, the groove portion may be provided in a cylindrical shape including a top surface and a side surface. The top surface includes an inclined surface that advances in an axial direction as advancing in a circumferential direction. The distal end of the first leg portion 10B entering the groove portion having such a configuration advances in the axial direction along the inclined surface provided on the top surface while advancing in the circumferential direction, and thus draws a spiral. According to such a configuration, the distal end of the first leg portion 10B may be curved so as to draw a spiral even in a cylindrical side surface provided with no groove. In this way, the distal end side of the first leg portion 10B may be curved so as to surround the guide element G by providing the first deformation portion 20A with a configuration in which the distal end of the first leg portion 10B is guided in the circumferential direction and advanced in the axial direction at the same time.

The first leg portion 10B of the staple 10 may be preferably engaged with the guide element G by forming the second portion 10B2 of the staple 10 to surround at least a half or more, preferably one or more, of the outer periphery of the guide element G.

Since when the guide element G extends in a horizontal direction, the first leg portion 10B of the staple 10 comes into contact with the guide element G due to gravity, the staple 10 and the guide element G may not be in close contact with each other. On the other hand, when the guide element G extends in a vertical direction, it is preferable that the staple 10 and the guide element G are in close contact with each other so that the second portion 10B2 of the staple 10 is not detached from the guide element G due to gravity, and the staple 10 is bent or curved so that the staple 10 is fixed to the guide element G.

The second deformation portion 20B may include, for example, a guide portion 20B1 that abuts against the second leg portion 10C and bends in a direction toward the distal end side of the first leg portion 10B when the staple 10 is moved in the opening direction D1 with respect to the first deformation portion 20A, and a fulcrum portion 20B2 that abuts against an inner side of the third portion 10C3 to function as a fulcrum at the time of bending the second leg portion 10C. In the present embodiment, the staple 10 has flexibility, and the third portion 10C3 is formed to be longer than the second portion 10B2. For this reason, the guide portion 20B1 may apply a sufficient moment to the staple 10 to bend the staple 10 by increasing a distance between the guide portion 20B1 and the fulcrum portion 20B2.

The binding machine 20 further includes the pushing portion 20C for moving the staple 10 in the opening direction D1. The pushing portion 20C includes a main body portion pushing portion 20C1 formed according to the shape of the main body portion 10A (in the present embodiment, formed in a curved shape according to the shape of the main body portion 10A), and a shoulder pushing portion 20C2 formed to have a linear cross section according to the shape of the first portion 10B1.

Hereinafter, an example of the binding method will be described. However, the configuration of the binding machine is not limited to the present disclosure. A known configuration that may bend the staple 10 into a similar shape may be used.

Figure 2A:
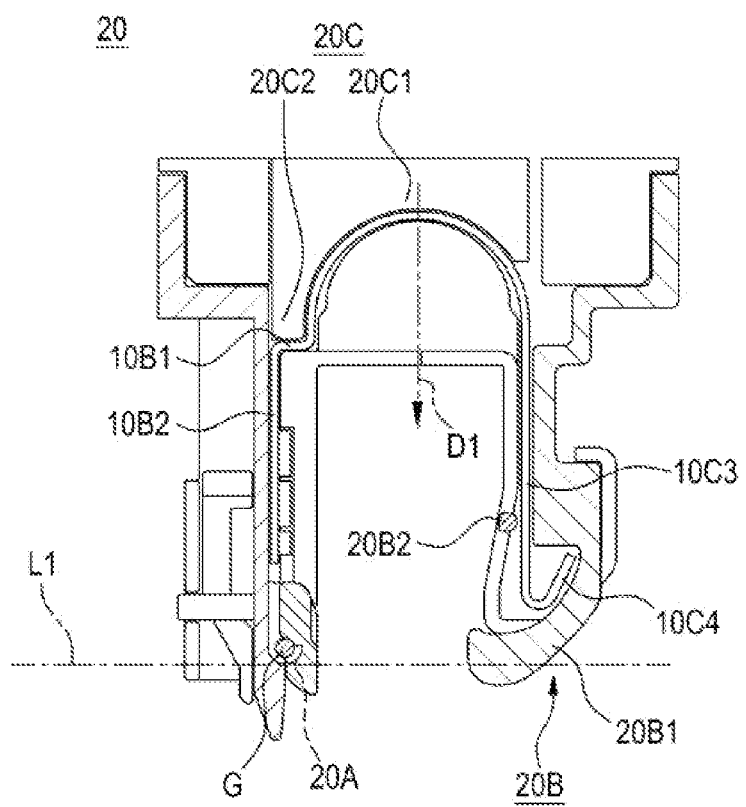
FIG. 2A is a diagram showing a step of a binding method according to the embodiment.

FIG. 2A shows a state in which the staple 10 is attached to the binding machine 20. The staple 10 is not deformed in this state, and thus has the same configuration as that shown in FIG. 1A.

Figure 2B:
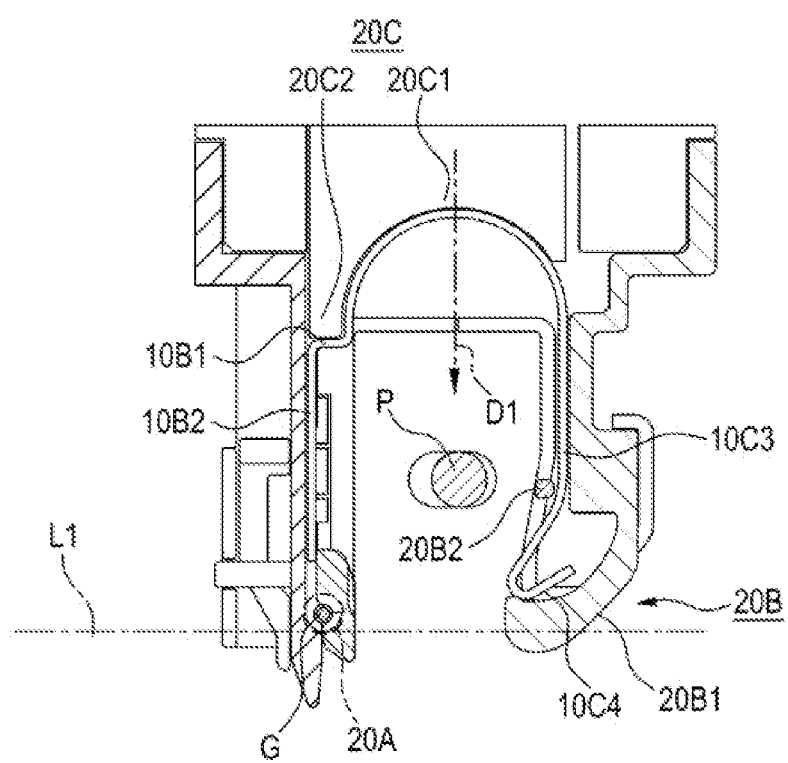
FIG. 2B is a diagram showing a step of the binding method according to the embodiment.

Thereafter, binding is started in a state in which the stem or the like P is disposed in the staple 10 (region surrounded by the main body portion 10A, the first leg portion 10B, and the second leg portion 10C). The stem or the like P and the guide element G extend in substantially the same direction (direction perpendicular to the paper surface). FIG. 2B shows a state in which the staple 10 is moved in the opening direction D1 using the pushing portion 20C, whereby the distal end of the second leg portion 10C in the opening direction D1 abuts against the guide portion 20B1, and the second leg portion 10C starts curving.

As shown in the drawing, an abutment surface of the guide portion 20B1 with the second leg portion 10C is formed to have an inclined portion (inclined so as to approach the first leg portion 10B as advancing in the opening direction D1). For this reason, the distal end side of the second leg portion 10C abutting against the guide portion 20B1 moves in a direction toward the distal end of the first leg portion 10B. At this time, the fulcrum portion 20B2 abuts on a predetermined portion at the inner side of the third portion 10C3. For this reason, the third portion 10C3 is curved in a direction toward the distal end of the first leg portion 10B with a portion abutting against the fulcrum portion 20B2 as a fulcrum.

Further, the abutment surface of the guide portion 20B1 with the second leg portion 10C is formed so as to include a portion (FIG. 3A) that is inclined (inclined so as to advance in the axial direction as advancing in the opening direction D1) in a direction (hereinafter, referred to as an "axial direction") substantially in the extending direction of the guide element G and perpendicular to the opening direction D1, which is an axial direction of the spiral groove portion formed by the first deformation portion 20A. For this reason, the distal end side of the second leg portion 10C also moves gently in the axial direction away from a plane including the main body portion 10A simultaneously with the movement in the direction toward the distal end of the first leg portion 10B.

A means for moving the distal end side of the second leg portion 10C in the direction away from the plane including the main body portion 10A simultaneously with the movement in the direction toward the distal end of the first leg portion 10B is not limited to the above. For example, such a means may be provided in the first deformation portion 20A. Specifically, an inclined surface that is inclined in the direction away from the plane including the main body portion 10A toward the distal end of the first leg portion 10B may be provided at a portion corresponding to an inclined surface 20AA in FIG. 3A of the first deformation portion 20A, and the inclined surface 20AA may be provided at a position against which the distal end side of the second leg portion 10C abuts. With such a configuration, the distal end side of the second leg portion 10C is moved toward the first leg portion 10B while abutting against the inclined surface 20AA, whereby it is possible to simultaneously move the main body portion 10A in the axial direction away from the plane including the main body portion 10A while moving the main body portion 10A in the direction toward the first leg portion 10B.

Figure 2C:
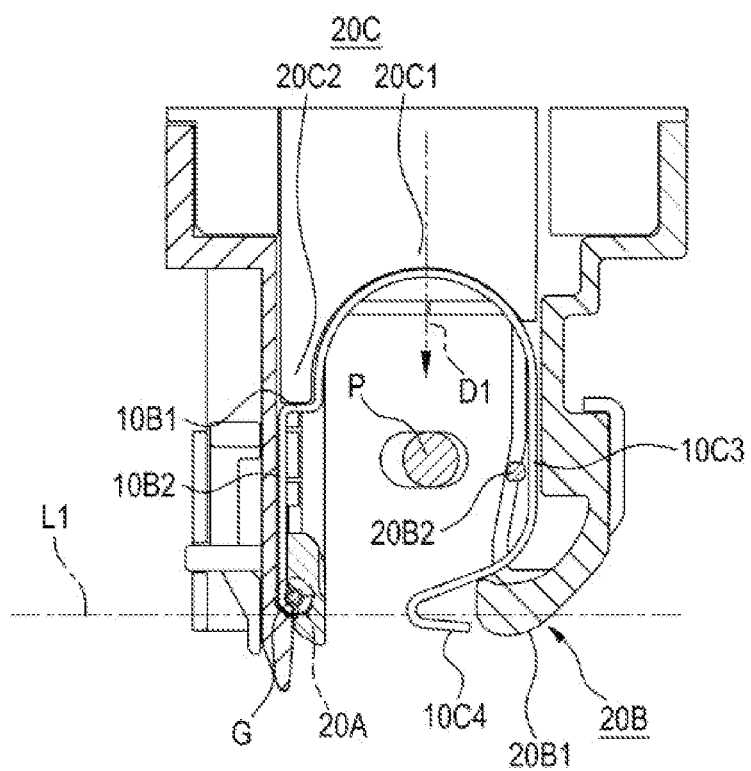
FIG. 2C is a diagram showing a step of the binding method according to the embodiment.
Figure 2D:
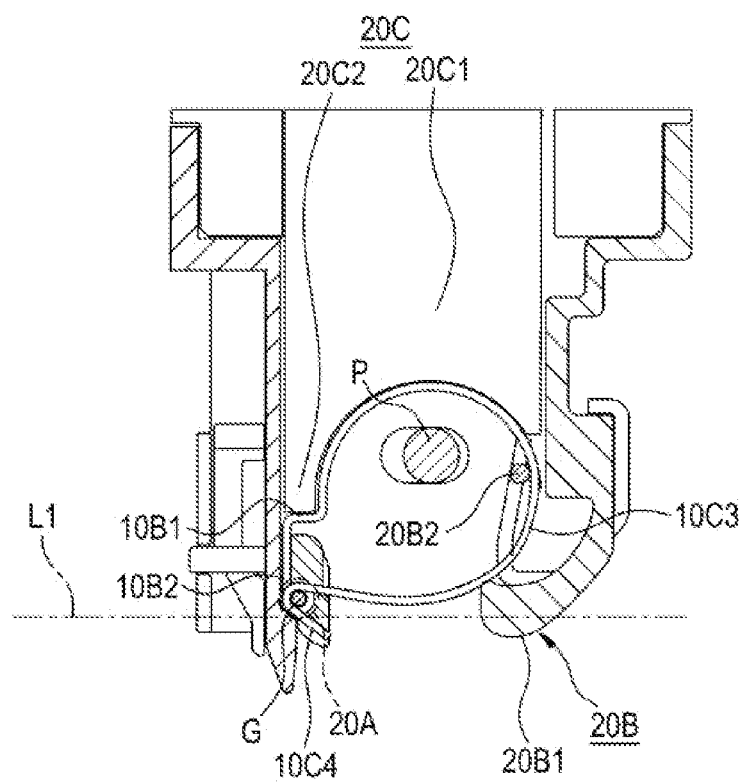
FIG. 2D is a diagram showing a step of the binding method according to the embodiment.

FIG. 2C shows a state in which the staple 10 is further moved in the opening direction D1 using the pushing portion 20C, whereby the distal end of the second portion 10B2 of the first leg portion 10B enters the groove portion of the first deformation portion 20A and starts curving. The guide element G is inserted through an opening hole formed in the axial direction (direction perpendicular to the paper surface). For this reason, as the staple 10 is moved in the opening direction D1 with respect to the first deformation portion 20A and the distal end of the second portion 10B2 enters the groove portion of the first deformation portion 20A, the distal end of the first leg portion 10B of the staple 10 may be deformed in a spiral shape surrounding the outer periphery of the guide element G with the guide element G as an axis.

On the other hand, a connection portion between the third portion 10C3 and the fourth portion 10C4 of the second leg portion 10C abuts against the guide portion 20B1 at the beginning of curving, and thereafter, as the curving proceeds, the fourth portion 10C4 abuts against the guide portion 20B1 to be bent. Thereafter, as shown in the drawing, since the fourth portion 10C4 moves over the guide portion 20B1, the third portion 10C3 abuts against the guide portion 20B1 to be bent. At this time point, since the curving proceeds, the third portion 10C3 and the fourth portion 10C4 approach the distal end of the first leg portion 10B at which the guide element G is disposed.

Figure 2E:
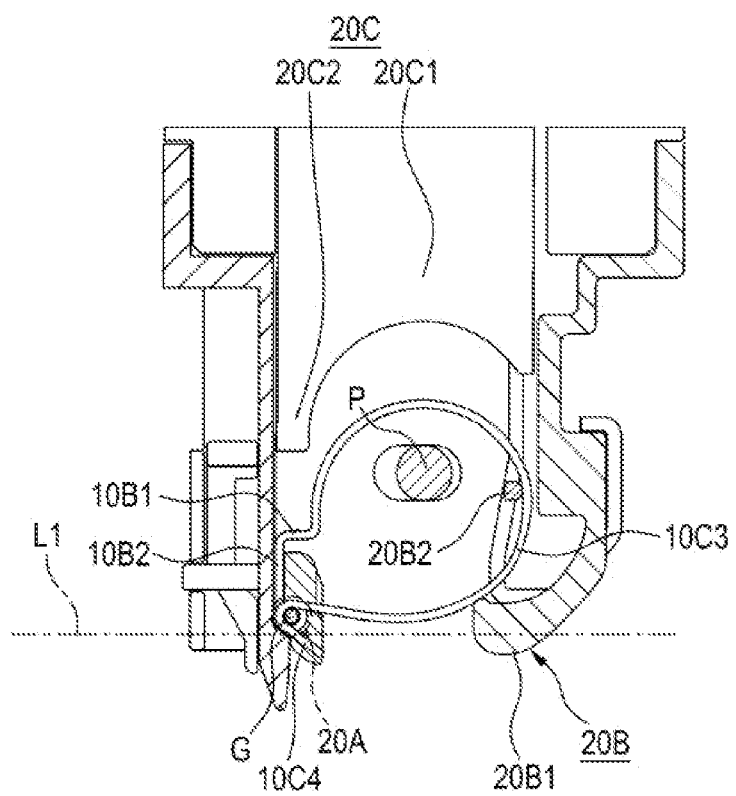
FIG. 2E is a diagram showing a step of the binding method according to the embodiment.
Figure 2F:
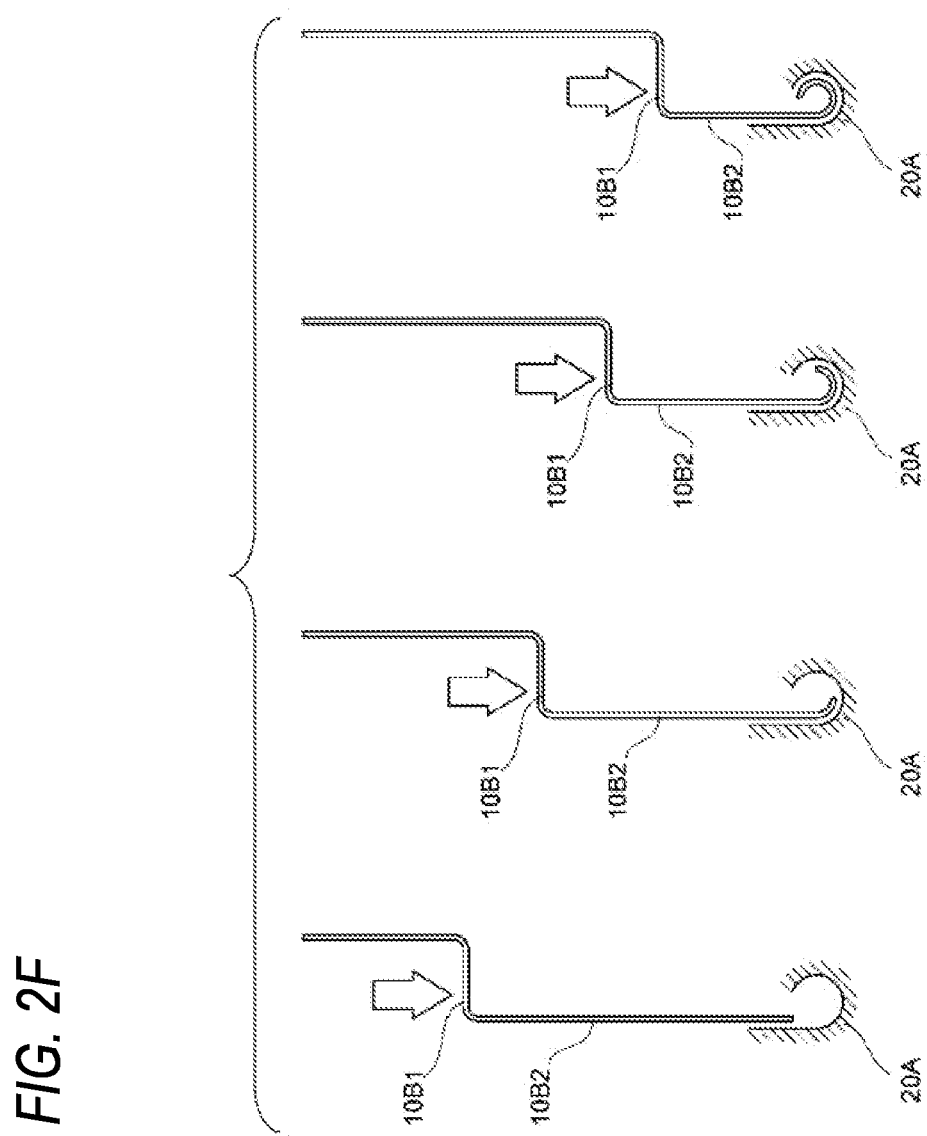
FIG. 2F is a diagram showing a step of the binding method according to the embodiment.
Figure 3A:
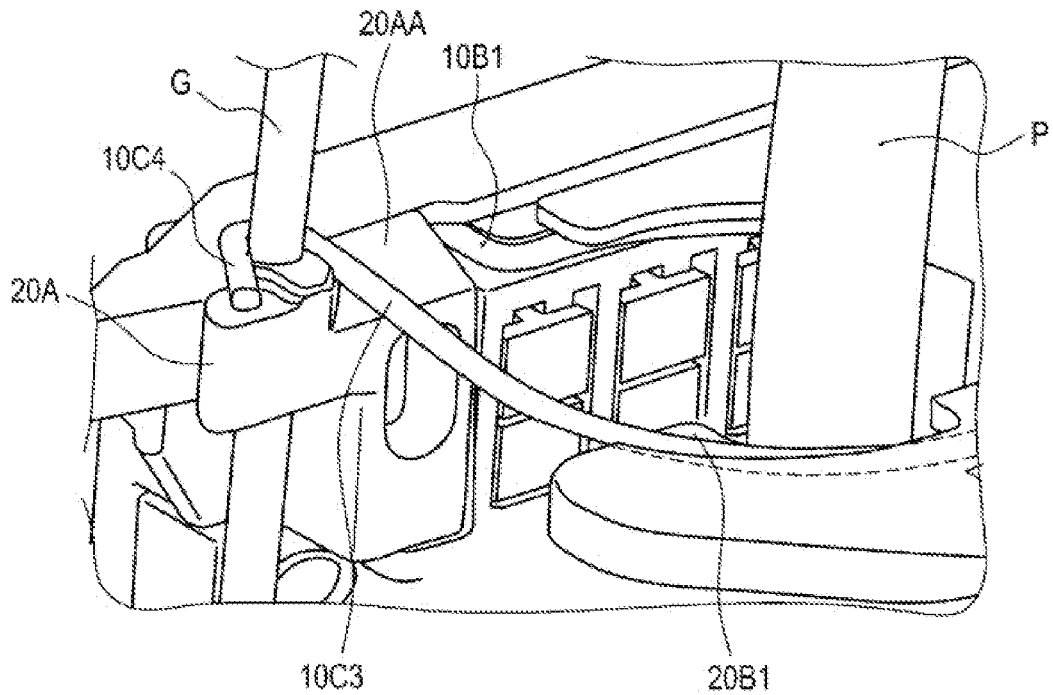
FIG. 3A is an enlarged perspective view showing a state during binding.

FIG. 2E is a cross-sectional view showing a state in which the second leg portion 10C reaches the guide element G and the fourth portion 10C4 is engaged with the guide element G by further moving the staple 10 in the opening direction D1 using the pushing portion 20C, and FIG. 3A is a perspective view at this time. As shown in FIG. 2E, when the fourth portion 10C4 engages with the guide element G, the opening of the main body portion 10A is closed in the cross-sectional view. As shown in FIG. 3A, since the inclined surface of the guide portion 20B1 is also formed to be inclined in the axial direction, the distal end of the second leg portion 10C advances in the axial direction so as to be separated from a plane including the main body portion 10A and the first leg portion 10B as the curving proceeds. As a result, the second leg portion 10C engages with the guide element G when the first leg portion 10B is at a position separated from a portion engaging with the guide element G.

Figure 3B:
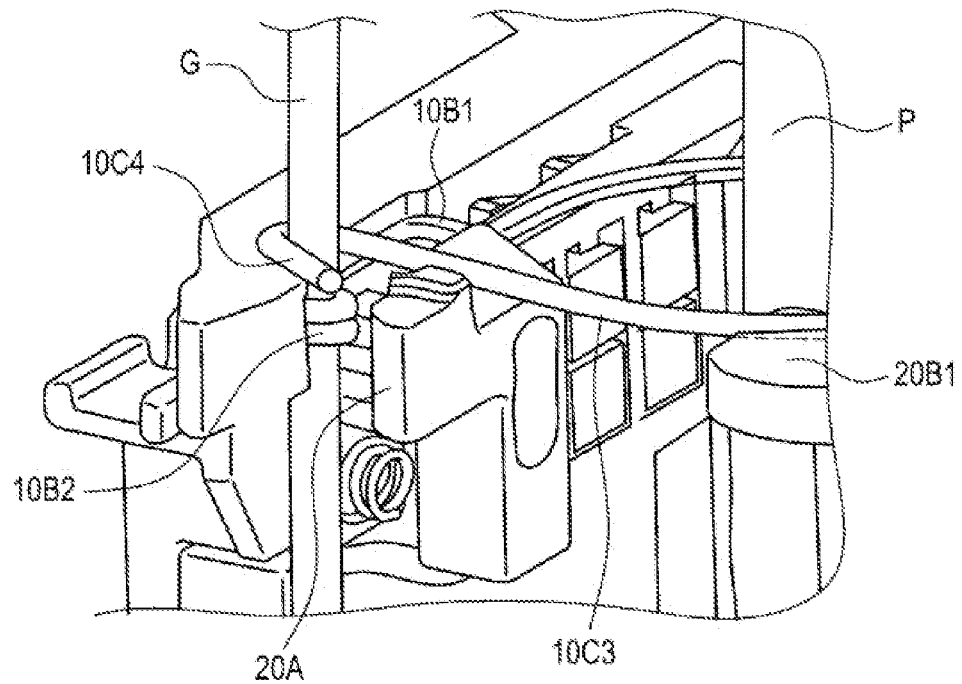
FIG. 3B is an enlarged perspective view showing a state during binding.
Figure 4:
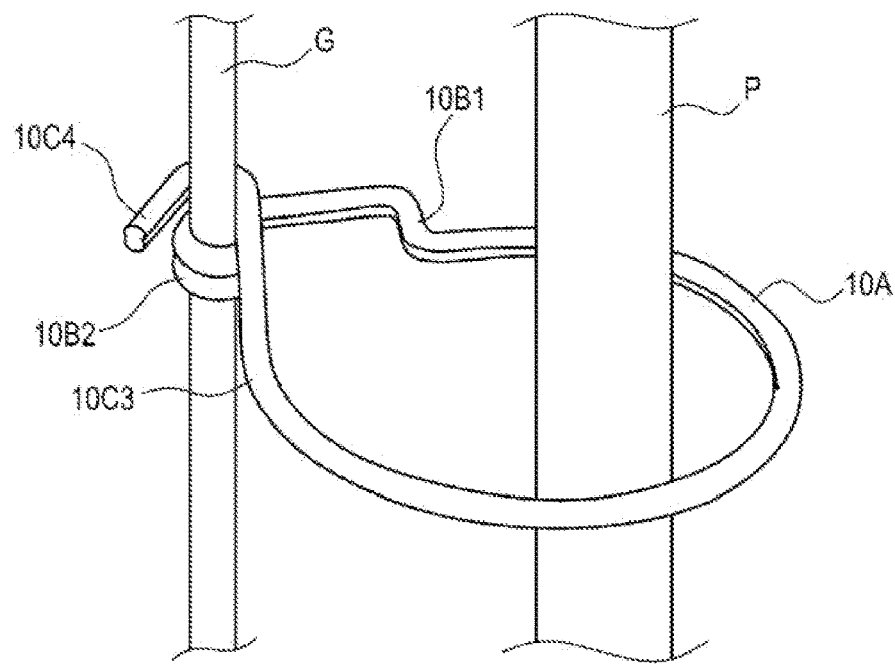
FIG. 4 is a perspective view showing a state in which a stem or the like is held on a guide element by the staple.

FIG. 3B shows a state in which the first leg portion 10B and the second leg portion 10C of the staple 10 are engaged with the guide element G, respectively, and then a part of a component in which the groove portion of the first deformation portion 20A is formed is moved. FIG. 4 is a perspective view showing a state in which the stem or the like P is held by the guide element G by the staple 10. As shown in the drawings, the first leg portion 10B is held or fixed to the guide element G by being wrapped around the guide element G. On the other hand, the second leg portion 10C is hooked on the guide element G and is movably engaged with the guide element G. Since the third portion 10C3 has elasticity in the direction in which the closed opening is returned to the widening original position, the fourth portion 10C4 may apply a tension to the guide element G in the direction in which the opening is widened, that is, in the direction away from the first leg portion 10B. Therefore, it is possible to reduce the possibility that the staple 10 falls off the guide element G due to the deflection of the guide element G.

The inventors of the present application focused on the problem that, in a case of a staple including a main body portion that is curved and a leg portion that extends linearly from the main body portion without the first portion 10B1 being provided, it is difficult to press the main body portion that is curved straight in the opening direction, and thus it is difficult to correctly attach the staple to a binding machine and bend the leg portion, and conceived of providing the first portion 10B1 as a result of trial and error. By providing the first portion 10B1 and pressing this portion, the staple 10 may be pushed out in the opening direction D1 with high accuracy. In this case, the movement accuracy of the staple 10 may be improved by providing the first portion 10B1 such that the angle with the main body portion 10A is 90 degrees to about 90 degrees. As shown in FIG. 2E, since the first portion 10B1 is located in the vicinity of an axis of the second portion 10B2 compared to the main body portion 10A, for example, pressing the first portion 10B1 can transmit the force to the second portion 10B2 more efficiently than pressing the main body portion 10A.

Furthermore, in the case of a staple including a main body portion that is curved and a leg portion linearly extending from the main body portion, it becomes difficult to further widen the main body portion when the stem or the like P grows to a size corresponding to an inscribed circle of the main body portion, and thus a problem of preventing the growth of the stem or the like P may occur. In the staple 10 according to the present embodiment, the first portion 10B1 is provided, whereby a connection portion between the main body portion 10A and the first portion 10B1 may be deformed in the direction in which the main body portion 10A is widened by a relatively weak force, and thus it is possible to prevent the problem of inhibiting growth of the stem or the like P. On the other hand, since the main body portion 10A against which the stem or the like P may abut during growth is curved, it is possible to prevent the problem that the stem or the like P is damaged by the main body portion 10A.

In addition, the second portion 10B2 and the third portion 10C3 are provided to be substantially parallel to each other, whereby it is possible to prevent the problem that adjacent staples 10 interfere with each other when a plurality of adjacent stems P are held by the guide element G.

Furthermore, the staple 10 may hold or fix the first leg portion 10B to the guide element G, and may movably engage the second leg portion 10C with the guide element G.

As a result, the second leg portion 10C may be easily detached from the guide element G. As the stem or the like P grows, the staple 10 may also be deformed in the extending direction of the guide element G. Furthermore, since the second portion 10B2 is formed to be shorter than the third portion 10C3, the second portion 10B2 may be firmly held and fixed to the guide element G, and on the other hand, since the third portion 10C3 is formed to be longer than the second portion 10B2, the second leg portion 10C may be easily detached from the guide element G by a slight movement. For this reason, it is possible to reduce a burden on a worker at the time of harvesting, collecting after harvesting, or disposing the stem or the like P.

Since the third portion 10C3 is formed to be longer than the width of the opening formed by the main body portion 10A, that is, the distance between the one end portion 10A1 and the other end portion 10A2 of the main body portion, the opening may be closed by bending the third portion 10C3.

For this reason, it is possible to reduce the possibility that the stem or the like P is detached from the staple 10.

Since the third portion 10C3 that is bent has elasticity in the direction in which the closed opening is returned to the widening original position, the fourth portion 10C4 may apply a tension to the guide element G in the direction in which the opening is widened, that is, in the direction away from the first leg portion 10B. Therefore, it is possible to reduce the possibility that the staple 10 falls off the guide element G as the guide element G deflects.

As shown in FIG. 2E, the fourth portion 10C4 is bent counterclockwise (example of a "first circumferential direction") about the guide element G, thereby being engaged with the guide element G. On the other hand, as shown in FIG. 3B, the second portion 10B2 is also curved or bent counterclockwise (example of a "first circumferential direction") about the guide element G so as to surround the guide element G. As a result of such a configuration, the guide element G may be disposed on the inner side where the stem or the like P is disposed with respect to the second portion 10B2, and thus the distal end of the second portion 10B2 is easily wound around the guide element G.

The staple 10 may be smoothly moved and bent when the deformation of the first leg portion 10B is started after the deformation of the second leg portion 10C is started to make deformation start timings of the two leg portions different each other, as compared with a case where deformation of the two leg portions is simultaneously performed. In addition, it is possible to easily make the deformation start timings of the two leg portions different from each other by forming the third portion 10C3 to be longer than the second portion 10B2.

A means for engaging the first leg portion 10B with the guide element G is not limited to a method of curving and winding the second portion 10B2 around the guide element G. For example, the second portion 10B2 of the first leg portion 10B may be bent at an acute angle to sandwich the guide element G. With such a configuration, the first leg portion 10B may be fixed to the guide element G by caulking.

[Binding Method of Staple 10 without Using Binding Machine 20]

Figure 5:
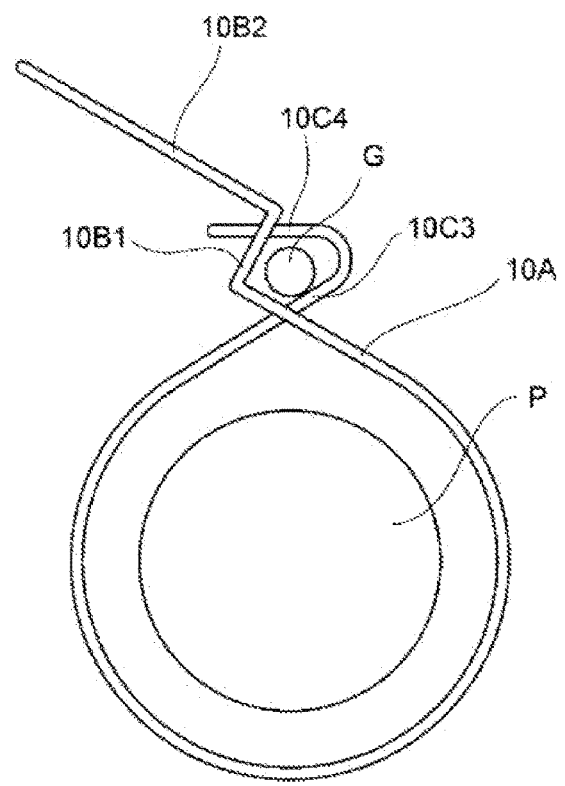
FIG. 5 is a schematic diagram showing another aspect in which the stem or the like is held on the guide element by the staple.

The staple 10 according to the first embodiment may also be manually engaged with the guide element G, for example, without using a binding machine. FIG. 5 is a schematic diagram showing a bound state of the staple 10 bound without using a binding machine.

As shown in the drawing, since the connection portion between the main body portion 10A and the first portion 10B1 is bent, the first leg portion 10B and the second leg portion 10C may be suitably engaged with the guide element G by engaging the guide element G with the bent portion and the fourth portion 10C4 so as to sandwich the guide element G from both sides. In addition to the engagement of the fourth portion 10C4 with the guide element G, a distal end portion of the fourth portion 10C4 may be further engaged with the first portion 10B1 or the second portion 10B2.

In such a configuration, it is possible to make it difficult for the guide element G to detach from the bent portion by bending the guide element G such that the angle α1 (FIG. 1A) formed by the first portion 10B1 and the main body portion 10A is an acute angle.

The angle α1 formed by the first portion 10B1 and the main body portion 10A may be further reduced to sandwich the guide element G between the first portion 10B1 and the main body portion 10A, and the first leg portion 10B may be fixed to the guide element G by caulking. At this time, the first leg portion 10B may be easily plastically deformed and fixed to the guide element G by gripping the second portion 10B2 that extends long. Even after the growth of the stem or the like P, the staple 10 may be easily detached from the guide element G by gripping the second portion 10B2 that extends long.

Second Embodiment

Figure 6A:
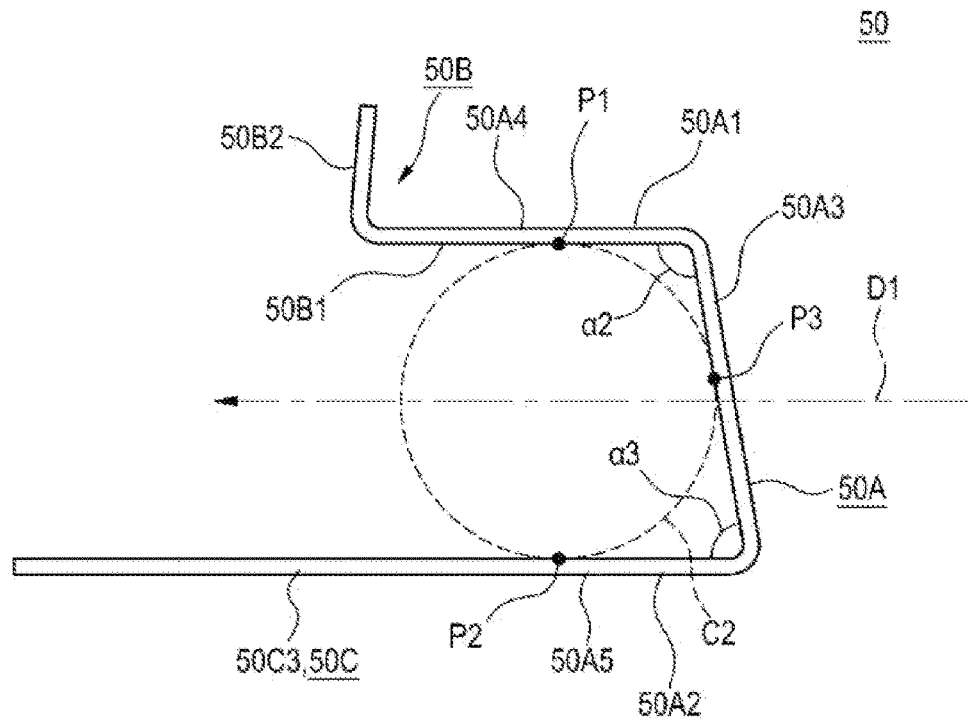
FIG. 6A is a diagram showing an example of a staple according to an embodiment.
Figure 6B:
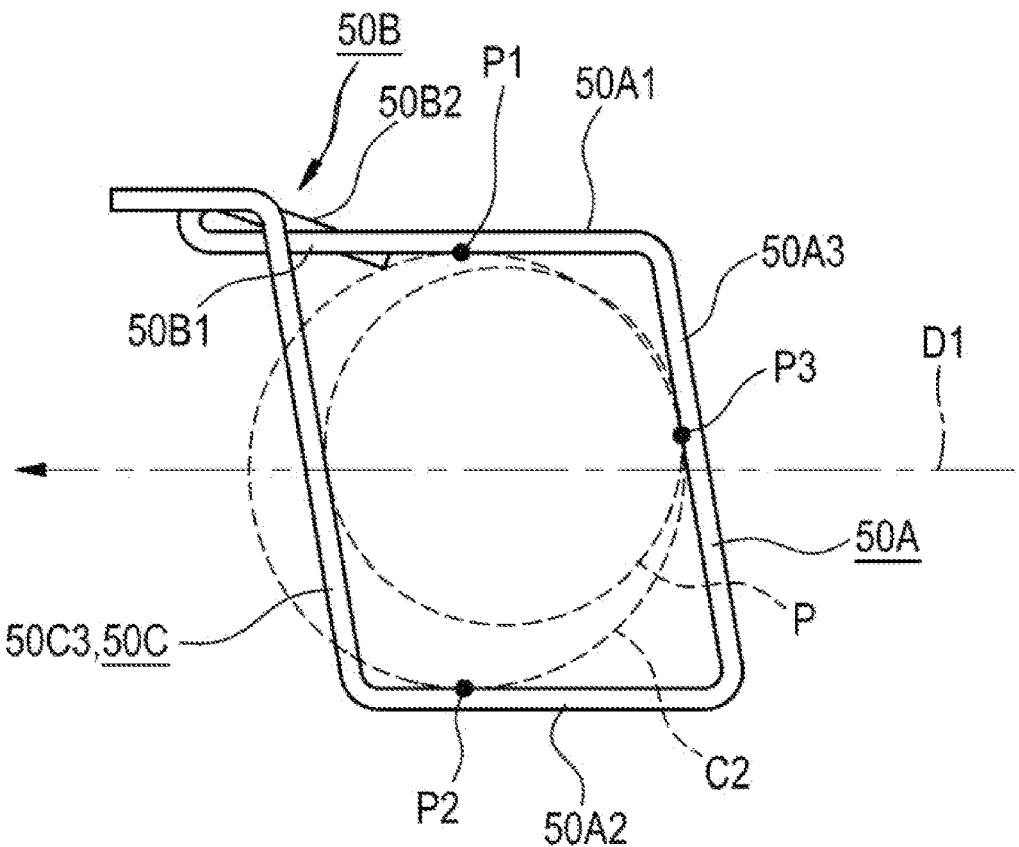
FIG. 6B is a diagram showing an example of the staple in a bound state.

FIG. 6A shows a staple 50 according to a second embodiment. FIG. 6B shows an example of the staple 50 in a bound state. Regarding portions that are understood by those skilled in the art because they are the same as or similar to the description relating to the staple 10 according to the first embodiment, description thereof will be omitted or simplified, and different portions will be mainly described.

The staple 50 includes a main body portion 50A, a first leg portion 50B continuously extending from one end portion 50A4 of the main body portion 50A, and a second leg portion 50C continuously extending from the other end portion 50A5.

The main body portion 50A has a substantially C shape or U shape in which one side (left direction of a paper surface) is opened, and has at least three contact points P1 to P3 circumscribing a virtual maximum inscribed circle C2. The main body portion 50A includes a first side portion 50A1 extending in a tangent direction (opening direction) of the inscribed circle C2 at the first contact point P1 on a first leg portion 50B side, a second side portion 50A2 extending substantially parallel to the first side portion 50A1 in a tangent direction (opening direction) of the inscribed circle C2 at the second contact point P2 on a second leg portion 50C side, and a third side portion 50A3 connecting the first side portion 50A1 and the second side portion 50A2 and extending in a tangent direction of the inscribed circle C2 at the third contact point P3 between the contact points P1 and P2. The third side portion 50A3 according to the present embodiment forms an obtuse angle with the first side portion 50A1 and forms an acute angle with the second side portion 50A2. That is, an angle α2 between the third side portion 50A3 and the first side portion 50A1 is larger than 90 degrees, and an angle α3 between the third side portion 50A3 and the second side portion 50A2 is smaller than 90 degrees. Therefore, the third side portion 50A3 is formed to be longer than a distance between the one end portion 50A4 and the other end portion 50A5 of the main body portion 50A.

The first leg portion 50B and the second leg portion 50C are portions for engaging with the guide element G.

As shown in FIG. 6A, the first leg portion 50B includes a first portion 50B1 extending from the one end portion 50A4 of the main body portion 50A in the tangent direction of the inscribed circle C2 at the first contact point P1, that is, in the opening direction, and a second portion 50B2 bent and extending outward from the first portion 50B1. Since the second portion 50B2 may have the same configuration as the first portion 10B1, detailed description thereof will be omitted. The first leg portion 50B may be implemented by only the second portion 50B2 that is bent outward from the one end portion 50A4 of the main body portion 50A without the first portion 50B1.

As shown in FIG. 6B, the third portion 50C3 is a portion that is bent to close an opening formed by the main body portion 50A. In a state before being bent (FIG. 6A), the third portion 50C3 is formed to extend continuously from the second side portion 50A2 in the opening direction D1.

In order to close the opening when being bent, the third portion 50C3 is preferably formed to be longer than a width of the opening formed by the main body portion 50A, that is, the distance between the one end portion 50A4 and the other end portion 50A5 of the main body portion.

In order to close the opening when being bent parallel to the third side portion 50A3, the third portion 50C3 is more preferably formed to be longer than the third side portion 50A3.

As shown in FIG. 6B, the staple 50 forms a parallelogram including the first side portion 50A1, the second side portion 50A2, and the third side portion 50A3 by bending the third portion 50C3 parallel to the third side portion 50A3. A shape of the parallelogram is determined according to a bending position of the third portion 50C3. In the present embodiment, the third portion 50C3 is preferably bent such that the third side portion 50A3 forms a long side of the parallelogram and sides including the first side portion 50A1 and the second side portion 50A2 form short sides of the parallelogram. With such a configuration, when the stem or the like P in the parallelogram grows, the stem or the like P may first abut against the third side portion 50A3 or the third portion 50C3 corresponding to the long side that is more easily bent. For this reason, it is possible to prevent inhibition of the growth of the stem or the like P as compared with a case where the stem or the like P abuts against the short side which is difficult to bend. This drawing shows a state in which the grown stem or the like P first abuts against the third side portion 50A3 and the third portion 50C3.

The third side portion 50A3 may have a rectangular shape that forms a right angle with the first side portion 50A1 and the second side portion 50A2, or may form an obtuse angle with the first side portion 50A1 and form an acute angle with the second side portion 50A2.

[Binding Method of Staple 50 Using Binding Machine 60]

Next, a binding method of the staple 50 using a binding machine 60 will be described. FIGS. 7A to 7D are schematic diagrams showing a process of engaging the staple 50 with the guide element G using the binding machine 60. On a left side of each drawing, the staple 50 when viewed from a viewpoint parallel to a plane including the main body portion 50A is shown (the binding machine 60 is not shown). FIG. 7E is an enlarged cross-sectional diagram schematically showing a state in which the second portion 50B2 of the staple 50 is bent and fixed to the guide element G using a claw portion 60A1 of the binding machine 60.

Figure 7A:
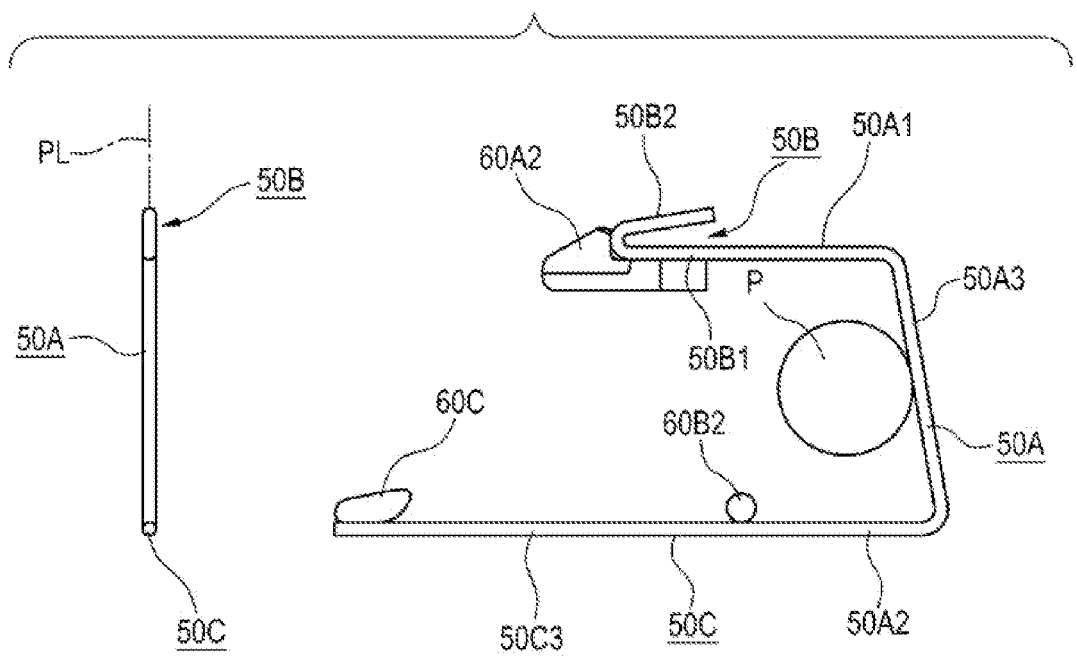
FIG. 7A is a diagram showing a step of a binding method according to the embodiment.

The staple 50 shown in FIG. 7A and the like is different from the staple 50 shown in FIG. 6A in that the second portion 50B2 is more largely bent. As a result, an angle between the second portion 50B2 and a straight line including the first side portion 50A1 (or the first portion 50B1) is 45 degrees or less. However, since the other points have substantially the same structure as that of the staple 50 shown in FIG. 6A, the same reference numerals are given and detailed description thereof is omitted here.

The binding machine 60 includes the claw portion 60A1 (FIG. 7E) for bending the second portion 50B2 of the staple 50, a guide element fixing portion 60A2 for fixing the second portion 50B2 to the guide element G, a second deformation portion 60B for bending a predetermined portion of the second leg portion 50C of the staple 50 to move a distal end side of the second leg portion 50C of the staple 50 toward a distal end side of the first leg portion 50B, and a third deformation portion 60C for bending a portion on the distal end side of the second leg portion 50C in a direction away from the first leg portion 50B to form a fourth portion 50C4 (bent portion).

As shown in FIG. 7E, the claw portion 60A1 applies a load to the second portion 50B2 of the first leg portion 50B to press down the second portion 50B2 and fix the first leg portion 50B to the guide element G in a state in which the guide element G is sandwiched between the second portion 50B2 and the first portion 50B1 corresponding to a fixed-side wire of the first leg portion 50B. The claw portion 60A1 applies an inclined load to deform the second portion 50B2 so as not to collide with the fixed-side wire 50B1 when the second portion 50B2 is pressed down. The guide element fixing portion 60A2 is provided with a groove-shaped portion surrounded by a bottom surface and two side surfaces in order to prevent the fixed-side wire of the first leg portion 50B from moving. In FIGS. 7A to 7E, in order to clearly show the deformation and a positional relation between the first leg portion 50B and the second leg portion 50C, one side surface of the bottom surface and the two side surfaces constituting the guide element fixing portion 60A2, which is provided on a front side of the paper surface, is not shown for convenience. FIG. 7E shows a state in which the guide element G is sandwiched by the first portion 50B1, which is the fixed-side wire, and the second portion 50B2 and deformed. In the present embodiment, a step of fixing the guide element G to the first leg portion 50B by the claw portion 60A1 is executed during the bending of the second leg portion 50C, but the present invention is not limited thereto, and for example, the bending of the second leg portion 50C may be started after the step of fixing the guide element G to the first leg portion 50B is executed.

Figure 7B:
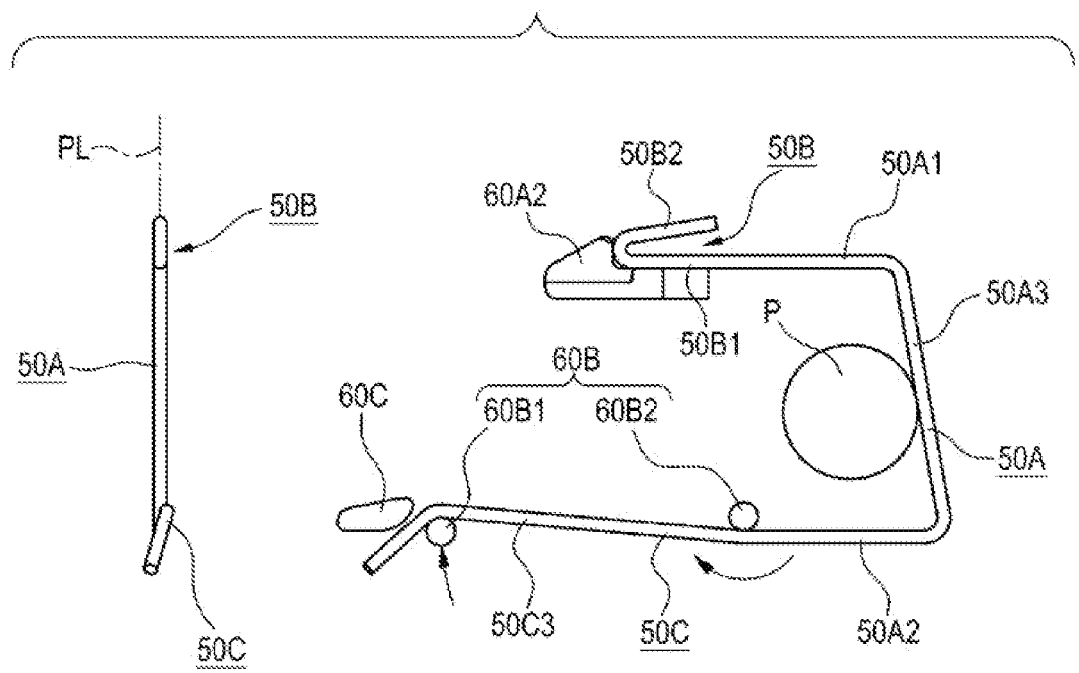
FIG. 7B is a diagram showing a step of the binding method according to the embodiment.

As shown in FIG. 7B, the second deformation portion 60B includes a movable portion 60B1 that abuts against an outer side of the portion on the distal end side of the second leg portion 50C and moves toward the distal end side of the first leg portion 50B while applying a load to the second leg portion 50C, and a fulcrum portion 60B2 that functions as a bending fulcrum by abutting against an inner side of a portion on a main body portion 50A side of the second leg portion 50C. Since the fulcrum portion 60B2 is fixed at least until the bending angle becomes a necessary angle, the second leg portion 50C may be bent with the portion abutting against the fulcrum portion 60B2 as a fulcrum in accordance with the movement of the movable portion 60B1. The fulcrum portion 60B2 may be fixed to the binding machine 60 or may be movable after being bent.

The third deformation portion 60C includes a wall portion that abuts against the inner side of a portion on the distal end side than the movable portion 60B1. Since the third deformation portion 60C is fixed, the fourth portion 50C4 may be formed by bending a region on the distal end side of the second leg portion 50C in a direction away from the first leg portion 50B with the movement of the movable portion 60B1.

Hereinafter, an example of a binding method will be described with reference to the drawings. However, the configuration of the binding machine is not limited to the present disclosure. A binding machine having another configuration capable of bending the staple 50 into a similar shape may be used.

FIG. 7A shows an initial state in which the staple 50 is attached to the binding machine 60. The staple 50 is not deformed in this state, and thus has the same configuration as that shown in FIG. 6A. A left side of the drawing shows that the main body portion 50A, the first leg portion 50B, and the second leg portion 50C are provided in the same plane PL.

Thereafter, binding is started in a state in which the stem or the like P is disposed inside the staple 50 (region surrounded by the main body portion 50A, the first leg portion 50B, and the second leg portion 50C). The stem or the like P and the guide element G (not shown) extend in substantially the same direction (direction perpendicular to the paper surface).

FIG. 7B shows a state in which the movable portion 60B1 is moved toward the distal end side of the first leg portion 50B while applying a load to the second leg portion 50C, whereby the second leg portion 50C starts bending with a portion abutting against the fulcrum portion 60B2 as a fulcrum. Further, it shows a state in which the region on the distal end side of the second leg portion 50C starts bending in a direction away from the first leg portion 50B by the third deformation portion 60C to be fixed.

Thereafter, the region on the distal end side of the second leg portion 50C passes through a gap between the movable portion 60B1 and the third deformation portion 60C, whereby the distal end side of the second leg portion 50C is largely bent to form the fourth portion 50C4. After passing through the gap between the movable portion 60B1 and the third deformation portion 60C, the region on the distal end side of the second leg portion 50C is deformed so as to slightly return due to spring-back, and after that, the shape of the fourth portion 50 C4 is determined. By adjusting the gap between the movable portion 60B1 and the third deformation portion 60C, it is possible to adjust the angle of the fourth portion 50C4 suitable for hooking and engaging with the guide element G.

The movable portion 60B1 simultaneously advances in the axial direction (normal direction of the plane PL) so as to be inclined with respect to the plane PL. For this reason, the left side of FIG. 7B shows that the distal end of the second leg portion 50C starts to be slightly separated from the plane PL.

Figure 7C:
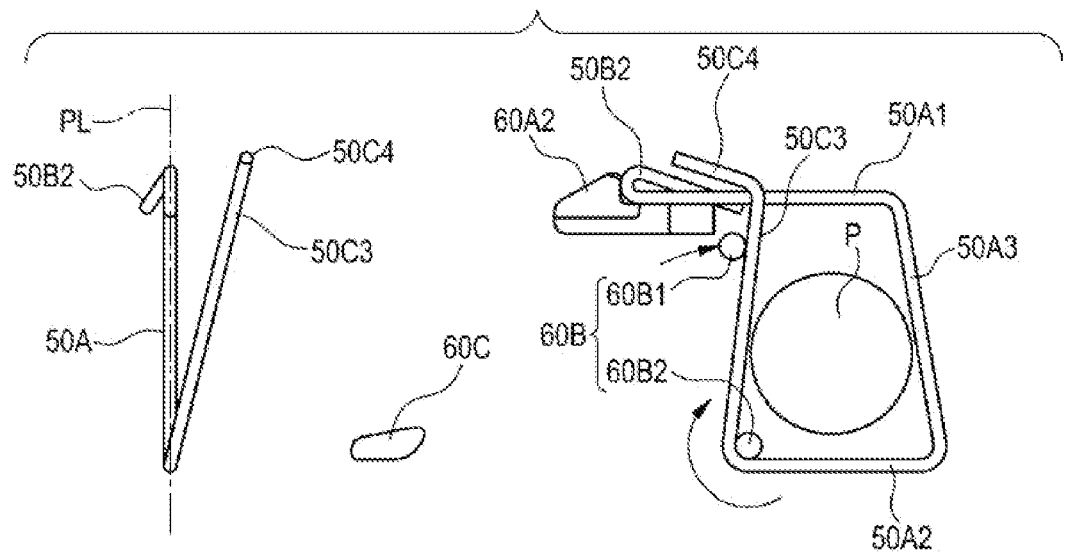
FIG. 7C is a diagram showing a step of the binding method according to the embodiment.

FIG. 7C shows a state of the staple 50 after the movable portion 60B1 is closest to the first leg portion 50B. At this time, the second leg portion 50C is bent until the fourth portion 50C4 passes through the guide element G with a portion abutting against the fulcrum portion 60B2 as a fulcrum. In the present embodiment, it is bent by 90 degrees or more. The distal end of the second leg portion 50C intersects the second portion 50B2. Further, as shown on the left side of the drawing, the distal end of the second leg portion 50C is largely separated from the plane PL.

At the same time, the claw portion 60A1 fixes the first leg portion 50B to the guide element G by pressing and bending the second portion 50B2 in a state in which the guide element G is sandwiched between the second portion 50B2 and the fixed-side wire of the first leg portion 50B. The left side of FIG. 7C shows that the end portion of the second portion 50B2 is separated from the plane PL as a result of the claw portion 60A1 pressing the second portion 50B2 so as to be inclined from the plane PL.

Figure 7D:
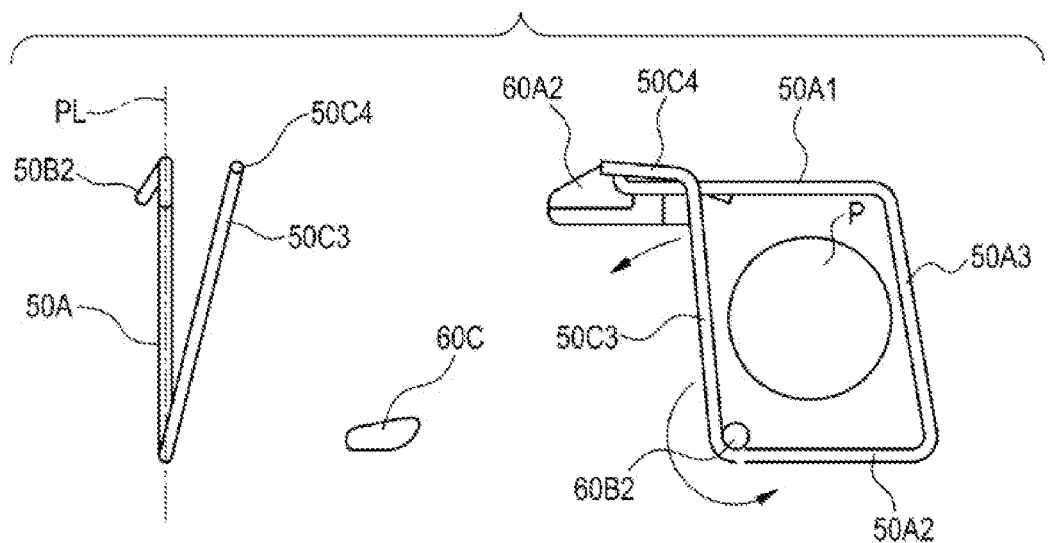
FIG. 7D is a diagram showing a step of the binding method according to the embodiment.
Figure 7E:
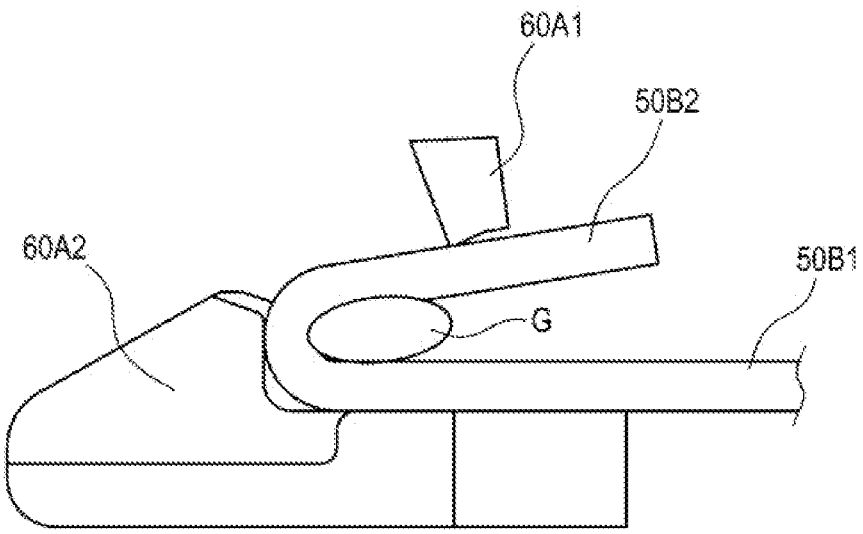
FIG. 7E is an enlarged cross-sectional diagram schematically showing a state in which a first portion is bent using a claw portion.

FIG. 7D shows a state in which the bending load by the movable portion 60B1 is released and the fourth portion 50C4 returns toward the guide element G by spring-back. At this time, the guide element G is fixed to the first leg portion 50B and engaged with the second leg portion 50C. A bending amount of the second leg portion 50C by the movable portion 60B1 is preferably adjusted such that the guide element G is engaged with the fourth portion 50C4 or the connection portion between the third portion 50C3 and the fourth portion 50C4.

Operations and effects based on the staple 50 and the binding method as described above will be described below.

Figure 8:
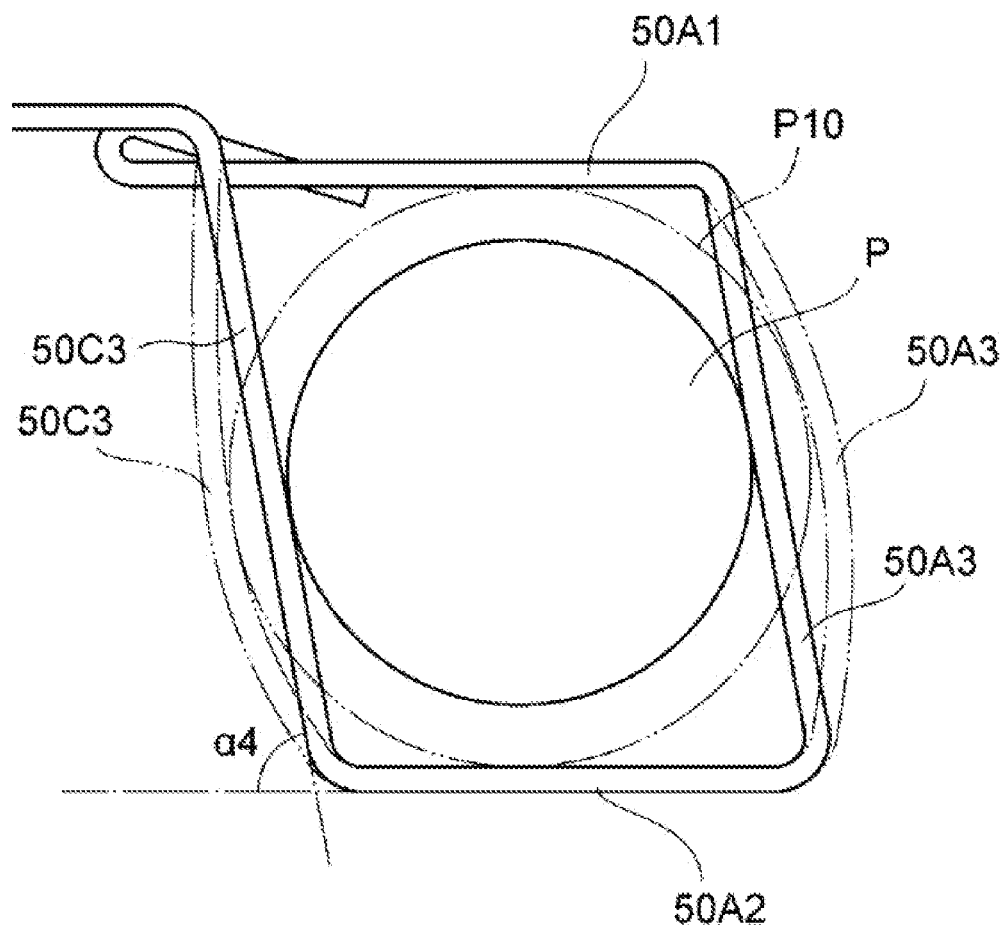

FIG. 8 is a schematic diagram showing a state in which the staple 50 is deformed as the stem or the like P grows. As shown in the drawing, when the stem or the like P grows, the stem or the like P may abut against the staple 50. At this time, when the staple is formed in an arc shape, a large force is required to widen the staple in a radial direction. Therefore, the growth of the stem or the like P is inhibited. On the other hand, the staple 50 according to the present embodiment is formed in a square shape. For this reason, the grown stem or the like P abuts against the vicinity of the center of any side in many cases. Since the vicinity of the center of the side is easily bent by a weak force, it is possible to prevent inhibition of growth of the stem or the like P compared to a case of an arc-shaped staple.

Further, the staple 50 is formed in a parallelogram having a long side. For this reason, the grown stem or the like P abuts against vicinity of a center of the long side in many cases. Since the vicinity of the center of the long side is easily bent by a weaker force than vicinity of a center of a short side, it is possible to further prevent inhibition of growth of the stem or the like P. This drawing schematically shows a state in which the third side portion 50A3 and the third portion 50C3 of the second leg portion 50C, which are long sides, bend first when the stem or the like P temporarily grows to a size of a circle P10.

Further, the second leg portion 50C of the staple 50 is bent in a parallelogram shape inclined in the left direction of the paper surface in the drawing. For this reason, it is possible to reduce an angle $\alpha 4$ at which the second leg portion 50C is bent, compared to a parallelogram inclined to the opposite side. Therefore, it is possible to quickly and easily perform the bending operation of the second leg portion 50C.

Furthermore, the staple 50 according to the present embodiment may apply a tension to the guide element G in accordance with deformation due to growth of the stem or the like P.

Figure 9A:
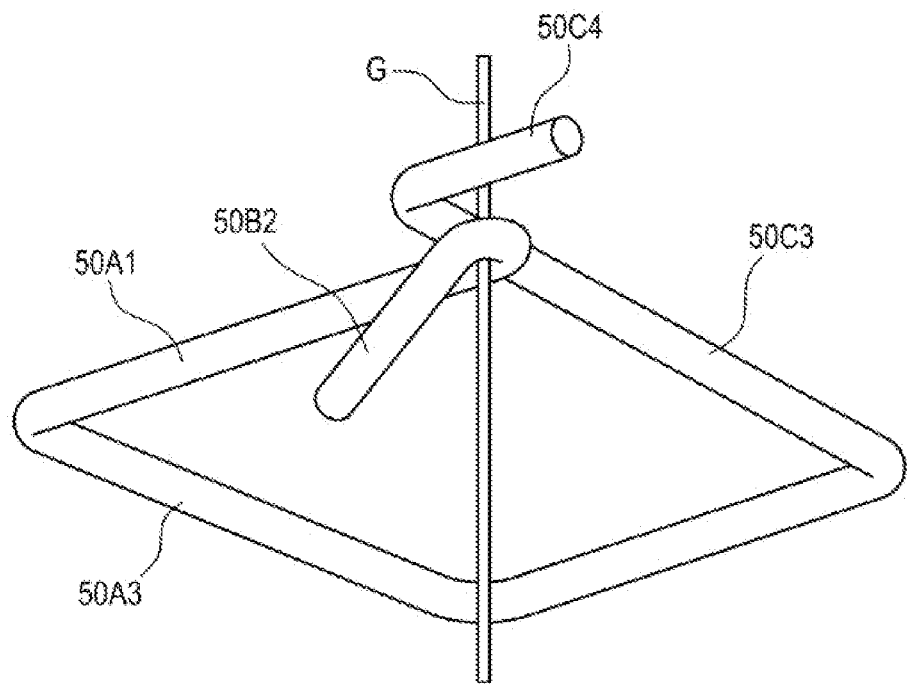
FIG. 9A is a diagram showing an example of the staple in a bound state.
Figure 9B:
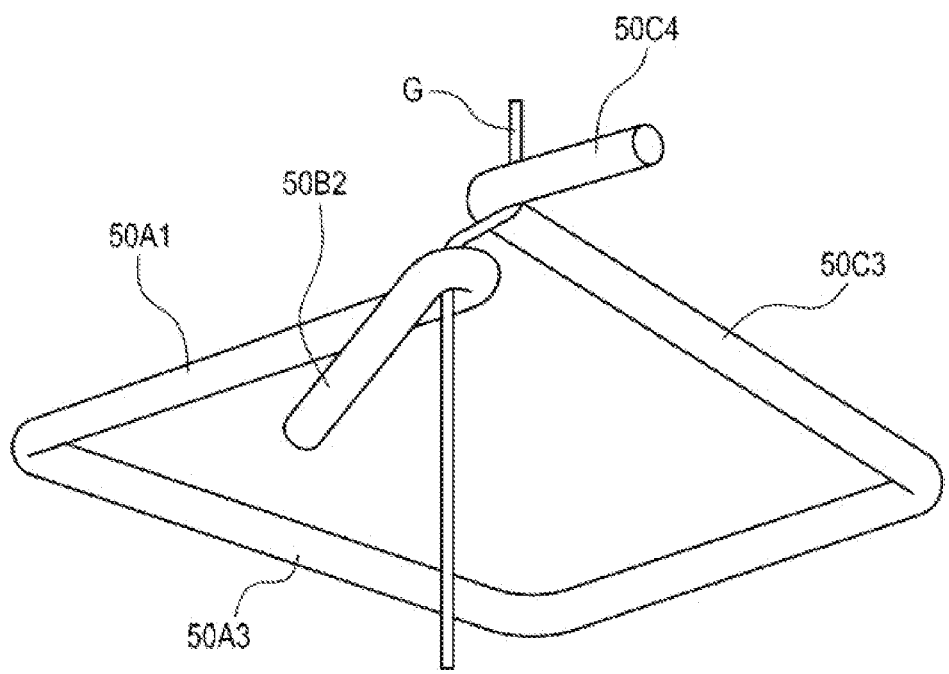
FIG. 9B is a diagram showing an example of the staple in a bound state.

FIG. 9A shows the shape of the staple 50 before the growth of the stem or the like P, and FIG. 9B shows the shape of the staple 50 when the stem or the like P grows and the staple 50 is widened.

As shown in FIG. 9A, since the stem or the like P does not initially abut against the staple 50, the first leg portion 50B of the staple 50 holds the guide element G, but the second leg portion 50C merely touches the guide element G or is engaged with the guide element G to an extent that the guide element G is not touched. However, as shown in FIG. 9B, the staple 50 is widened with the deformation due to the growth of the stem or the like P. Here, the first leg portion 50B of the staple 50 is bent counterclockwise (example of a "first circumferential direction") about the guide element G in the drawing, thereby being engaged with the guide element G. On the other hand, the second leg portion 50C is bent clockwise (example of a "second circumferential direction") about the guide element G. For this reason, a tension acts between the portion of the guide element G with which the first leg portion 50B is engaged and the portion of the guide element G with which the second leg portion 50C is engaged. For this reason, when the stem or the like P, which is required to be engaged, grows, the staple 50 may be firmly engaged with the guide element G in a manner that the staple 50 is not easily detached.

Further, since the second leg portion 50C extends linearly, the staple 50 may be easily manufactured. By using the binding method according to the present embodiment, the fourth portion (bent portion) 50C4 may be formed by bending the second leg portion 50C in one step. In addition, portions related to the same configuration as those of the staple according to the first embodiment may exhibit the same operation and effect.

[Binding Method of Staple 50 without Using Binding Machine 60]

The staple 50 according to the second embodiment may be manually engaged with the guide element G, for example, without using a binding machine. That is, as in the schematic diagram showing the bound state of the staple 10 shown in FIG. 5, since the connection portion between the first portion 50B1 and the second portion 50B2 of the staple 50 is bent, the first leg portion 50B and the second leg portion 50C may be suitably engaged with the guide element G by engagement such that the guide element G is sandwiched from both sides between the bent portion and the second leg portion 50C.

Even in such a configuration, the guide element G may be less likely to be detached from the bent portion by bending such that the angle formed by the first portion 50B1 and the second portion 50B2 is an acute angle.

The first leg portion 50B may be fixed to the guide element G by caulking by further reducing the angle between the first portion 50B1 and the second portion 50B2, and sandwiching the guide element G between the first portion 50B1 and the second portion 50B2.

MODIFICATION

Various modifications may be made to the present invention without departing from the gist thereof. For example, some of the components in an embodiment may be added to other embodiments within the range of ordinary creativity of those skilled in the art. In addition, some components in an embodiment may be replaced with corresponding components in another embodiment.

For example, the curved main body portion 10A of the staple 10 may be replaced with the main body portion 50A of the staple 50. In this case, a main body portion of the staple 10 includes a first side portion extending linearly in an opening direction and including one end portion of the main body portion, a second side portion including the other end portion of the main body portion and extending substantially parallel to the first side portion, and a third side portion connecting the first side portion and the second side portion and extending linearly.

Even with such a staple, it is possible to exhibit the same operation and effect as those of a staple having the same configuration. The third side portion may have a rectangular shape that forms a right angle with the first side portion and the second side portion, or may form an obtuse angle with the first side portion and form an acute angle with the second side portion.

The third side portion 50A3 of the staple 50 may form a substantially right angle with each of the first side portion 50A1 and the second side portion 50A2, or may form an acute angle with the first side portion 50A1 and an obtuse angle with the second side portion 50A2.

The second portion 50B2 of the staple 50 may be directly connected to the end portion 50A4 of the main body portion 50A, or may include a portion extending in the opening direction D1 therebetween.

Further, the side portions may be connected by a curve other than a circular arc at corner portions of a main body portion. The main body portion may be formed by connecting a curve and a straight line.

The staple 50 may further include the second portion 10B2 of the staple 10. In this case, the staple 50 further includes a second portion bent from a first portion and extending substantially parallel to a third portion.

When the staple 50 is further provided with a second portion, the second portion may be curved so as to hold the guide element G using a binding machine.

In this case, it is possible to use a binding machine in which the third deformation portion 60C is further provided in the binding machine 20. Such a binding machine may include a first deformation portion that curves or bends one distal end side of a wire, a second deformation portion that curves or bends a predetermined portion of the wire to move the other distal end side of the wire toward the one distal end side, and a third deformation portion that curves or bends a portion closer to the other distal end side than the predetermined portion outward. By providing an abutment surface inclined as the guide portion 20B1 which is a second deformation portion, a second leg portion may be curved or bent such that a distal end thereof moves toward a first leg portion (toward an inner side of an opening) even when the second leg portion extends linearly as in the staple 50. In this case, by providing a member fixed as the third deformation portion 60C at a position against which the distal end of the second leg portion abuts, the distal end portion of the second leg portion may be bent in a direction away from the first leg portion (toward an outer side of the opening) to provide a configuration corresponding to a bent portion. The first deformation portion is implemented by the same clincher as the first deformation portion 20A, whereby a distal end side of the first leg portion may be curved or bent to surround the guide element G.

By using such a binding machine, a staple obtained by further provided the second portion on the staple 50 is attached, whereby it is possible to execute a step of using the second deformation portion of the binding machine to curve or bend a predetermined portion of the second leg portion of the staple so as to move the distal end side of the second leg portion in a direction toward the first leg portion, and using the third deformation portion of the binding machine to curve or bend a portion closer to the distal end side of the second leg portion than the predetermined portion outward so as to form a bent portion, and it is possible to further execute a step of using the first deformation portion of the binding machine to curve or bend the distal end side of the second portion of the first leg portion of the staple so as to surround the guide element. It is possible to execute a step of engaging the formed bent portion with the guide element and applying a tension to the guide element in a direction away from the first leg portion. The step of holding the guide element may be executed before the step of forming the bent portion.

Figure 10:
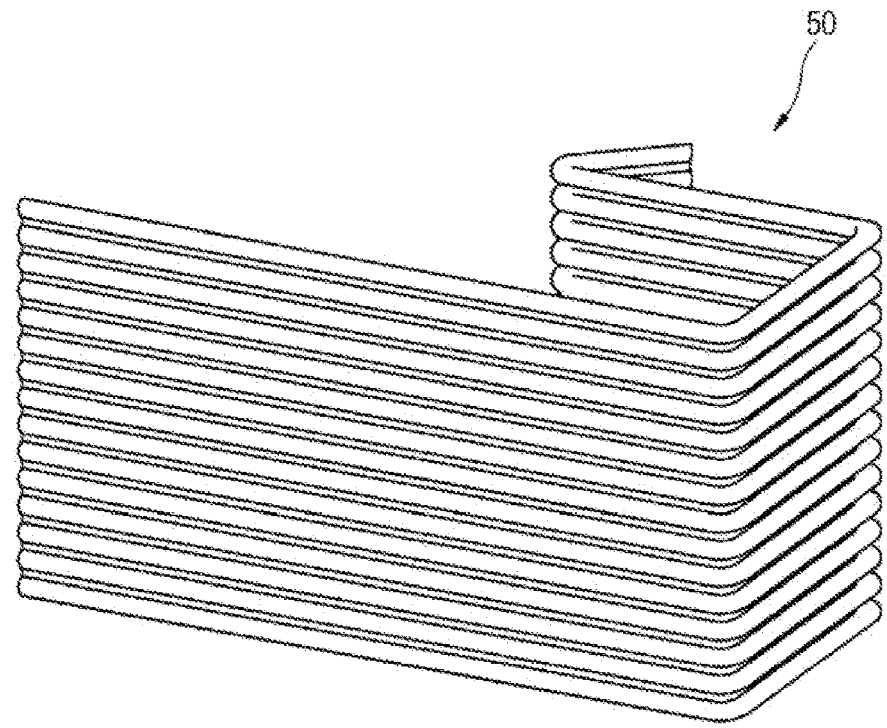
FIG. 10 is a diagram showing an example in which a plurality of staples are integrated.

The staple 10 or the staple 50 may be separated one by one, or may be coupled and integrated with each other. FIG. 10 shows a staple structure 500 including a plurality of staples 50 stacked so as to overlap one another and connected by an adhesive. As shown in the drawing, a binding operation may be continuously performed by integrating a plurality of staples such as the staple 10 or the staple 50 and attaching the integrated staples to a magazine or the like of the binding machine.

First Modification of First Embodiment

Hereinafter, a first modification of the staple 10 according to the first embodiment will be described.

Figure 11A:
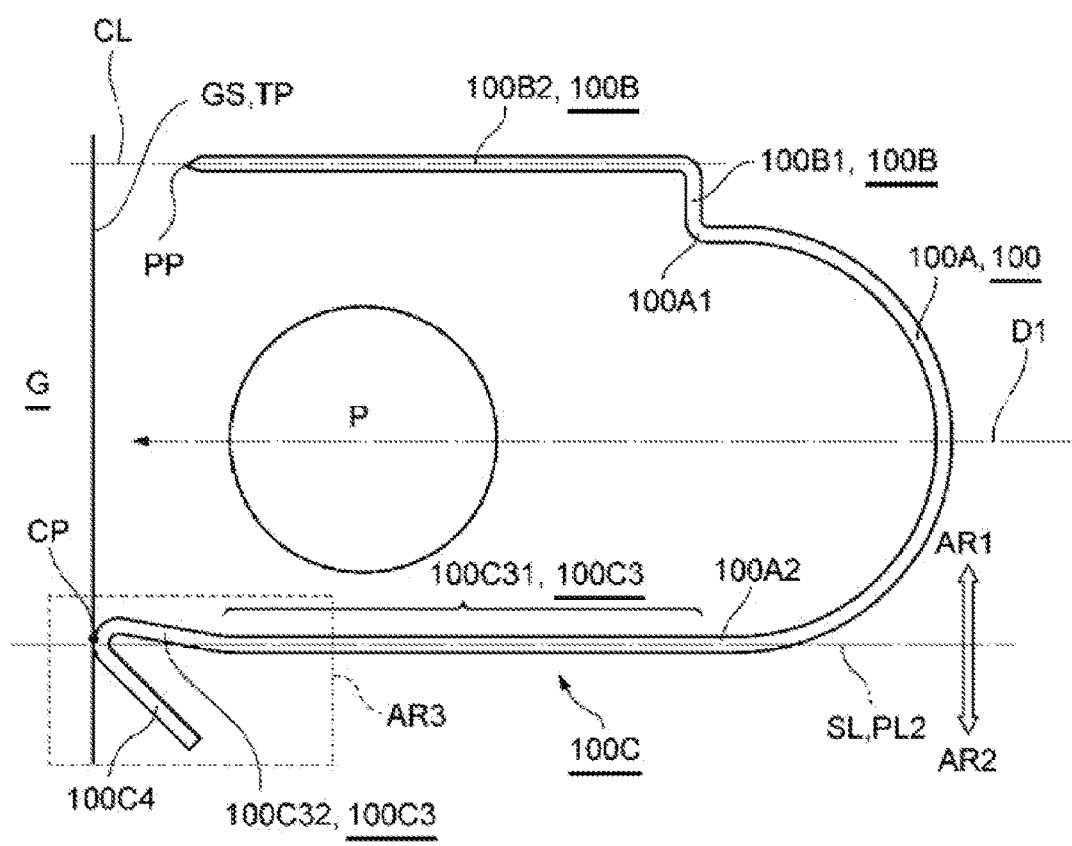
FIG. 11A is a diagram showing an example of a staple according to a modification of the embodiment.
Figure 11B:
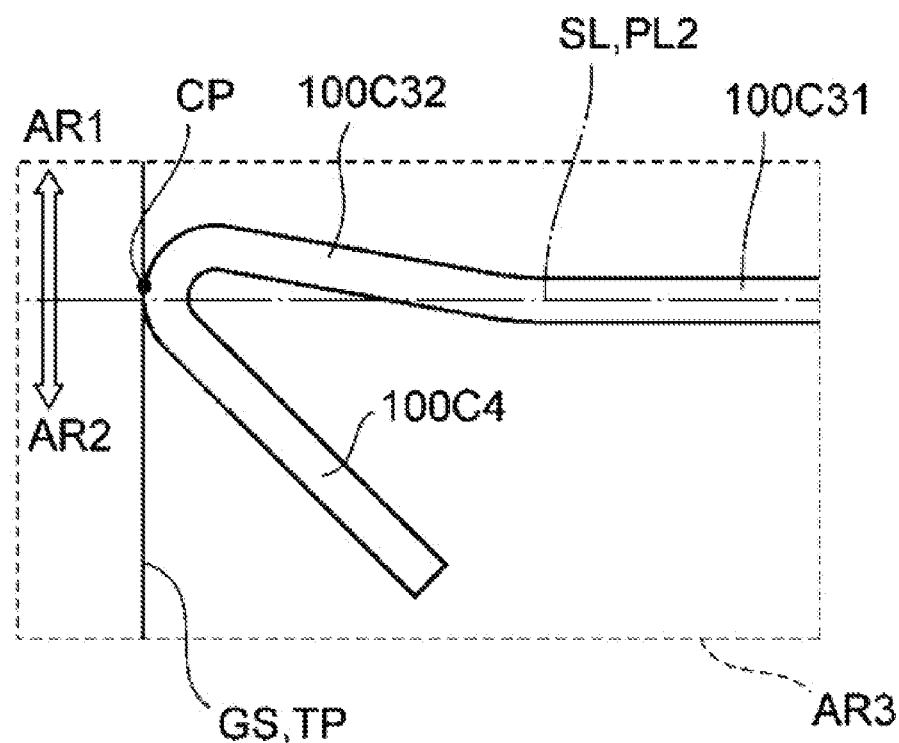
FIG. 11B is an enlarged view of a region AR3 in FIG. 11A.
Figure 11C:
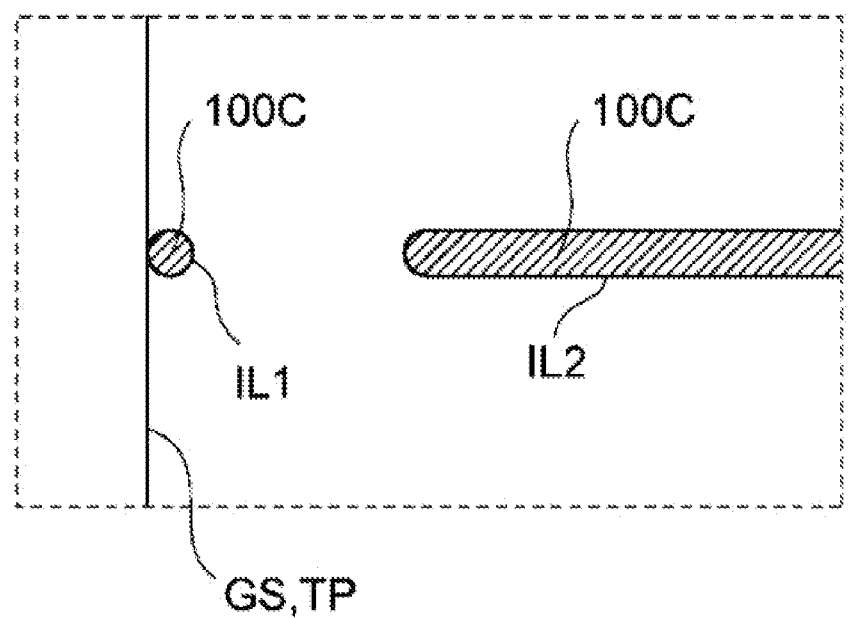
FIG. 11C is a cross-sectional diagram of the staple in FIG. 11A taken along a second plane PL2.

FIG. 11A shows a staple 100 according to a modification of the staple 10, FIG. 11B is an enlarged diagram of a region AR3 shown in FIG. 11A, and FIG. 11C is a cross-sectional diagram of the staple 10 taken along a second plane PL2 to be described later. Points having the same configuration as the staple 10 according to the first embodiment are given the same names, description thereof will be omitted or simplified, and different portions will be mainly described.

The staple 100 is common to the staple 10 in that the staple 100 includes a main body portion 100A, a first leg portion 100B continuously extending from one end portion of the main body portion 100A, and a second leg portion 100C continuously extending from the other end portion of the main body portion 100A.

The main body portion 100A is a portion that connects the first leg portion 100B and the second leg portion 100C and surrounds the stem or the like P, and is formed of, for example, an arc having a central angle of 180 degrees. The stem or the like P which is an object to be held may be a growing plant such as a stem or a fruit, or may be a column.

The first leg portion 100B is a portion for engaging with the guide element G. The first leg portion 100B includes a first portion 100B1 that is connected to one end portion 100A1 of the main body portion 100A, is bent, and extends to an outer side of an opening, and a second portion 100B2 that is further bent from the first portion 100B1 and extends in the opening direction D1. A portion of the main body portion 100A that extends from the one end portion 100A1 to the second portion 100B2 through the first portion 100B1, that is, the first portion 100B1 and the second portion 100B2 may be referred to as a crank portion. The first leg portion 100B includes the crank portion. Since the first leg portion 100B has the same configuration as the first leg portion 10B of the staple 10, detailed description thereof will be omitted.

Similarly to the first embodiment, a direction (left direction of the paper surface) from a closed side of the main body portion 100A (right side of the paper surface, for example, middle point of the main body portion 100A) toward an opening side (left side of the paper surface) in FIG. 11A is referred to as the opening direction D1. By relatively moving the main body portion 100A with respect to the object to be held in the opening direction D1, the main body portion 100A may be disposed so as to surround the object to be held.

The second leg portion 100C is a portion for closing the opening of the main body portion 100A and engaging with the guide element G or the first leg portion 100B in a top view by being bent by a binding machine or manually (by a manual operation of an operator).

The second leg portion 100C includes a third portion 100C3 that is connected to the other end portion 100A2 of the main body portion 100A and extends in the opening direction D1, and a fourth portion 100C4 that is bent outward from a distal end portion of the third portion 100C3.

The third portion 100C3 is a portion that is bent and closes, in a plan view (FIG. 11A), at least an opening that is formed between the one end portion 100A1 and the other end portion 100A2 of the main body portion 100A. Since a length of the third portion 100C3 is the same as that of the third portion 10C3 of the second leg portion 10C of the staple 10, detailed description thereof will be omitted. Therefore, the third portion 100C3 has a length to close the opening of the main body portion 100A (that is, a length larger than a distance between the end portion 100A1 and the end portion 100A2 of the main body portion 100A that are separated in a direction perpendicular to the opening direction D1). As shown in FIG. 11A, the third portion 100C3 is preferably formed to be longer than the second portion 100B2. In this case, as shown in FIG. 11A, the first leg portion 100B is separated from a tangent plane TP that is in contact with the second leg portion 100C at the distal end in the opening direction D1.

The third portion 100C3 according to the present modification includes a fifth portion 100C31 extending linearly from the end portion 100A2 in the opening direction D1, a distal end portion corresponding to a distal end of the third portion 100C3, and a sixth portion located between the fifth portion and the distal end portion. Here, the fifth portion 100C31 extends linearly, and thus is referred to as a linear portion 100C31 for the sake of convenience in the present modification.

The sixth portion corresponds to a portion that is provided between the distal end portion and the fifth portion 100C31 so as to connect the distal end portion and the fifth portion 100C31 and that is bent toward a first leg portion 100B side (inner side of the staple 10) with respect to the fifth portion 100C31. For this reason, the distal end portion corresponding to the distal end of the third portion 100C3 and the sixth portion are referred to as an end portion 100C32. It can also be said that the end portion 100C32 is connected to the linear portion 100C31 and corresponds to a portion at the distal end of the second leg portion 100C on an opening direction D1 side.

The linear portion 100C31 is a portion that linearly extends substantially parallel to the opening direction D1. In the present modification, most of the third portion 100C3 including a portion in a direction opposite to the opening direction D1 (for example, a portion of 66% or more of an entire length of the third portion 100C3) corresponds to the linear portion 100C31.

The end portion 100C32 is a portion that is bent or curved in a direction toward the first leg portion 100B with respect to the linear portion 100C31. In the present modification, a portion of the third portion 100C3 on the opening direction D1 side (for example, a portion of 34% or less of the entire length of the third portion 100C3) corresponds to the end portion 100C32.

As a result of the end portion 100C32 being bent with respect to the linear portion 100C31, the end portion 100C32 is provided such that a contact point CP between the second leg portion 100C (end portion 100C32) and the tangent plane TP that is perpendicular to a straight line SL passing through a center of the linear portion 100C31 and that is in contact with the second leg portion 100C (end portion 100C32) is present in a first region AR1 in which the first leg portion 100B is provided between the first region AR1 and a second region AR2 that are defined by a second plane PL2 (FIG. 11A and example of "second plane") including the straight line SL and being perpendicular to a first plane PL1 (FIG. 12B and example of "first plane") passing through the main body portion 100A, the first leg portion 100B, and the second leg portion 100C in an initial state. When the linear portion 100C31 includes a slightly deformed portion, the straight line SL passing through the center of the linear portion 100C31 may be a straight line approximating a line connecting with the center of the linear portion 100C31.

As shown in FIG. 11A, when a wall surface GS of the guide element G is flat and the first leg portion 100B is substantially perpendicularly engaged with the wall surface GS of the guide element G, the wall surface GS and the tangent plane TP substantially coincide with each other.

In the present modification, since the end portion 100C32 is bent in a direction approaching the first leg portion 100B with respect to the linear portion 100C31, the end portion 100C32 of the second leg portion 100C is displaced toward a first region AR1 side as advancing in the opening direction D1. However, the end portion 100C32 may be curved in a direction approaching the first leg portion 100B with respect to the linear portion 100C31.

The fourth portion 100C4 (example of the "bent portion") is a portion for engaging with the guide element G or the first leg portion 100B. The fourth portion 100C4 is bent outward (away from the opening) from the end portion 100C32 of the third portion 100C3 (more clearly, a distal end portion connected to a distal end of the end portion 100C32). For this reason, the fourth portion 100C4 is bent with respect to the end portion 100C32 so as to be displaced toward a second region AR2 side where the first leg portion 100B is not present.

As described above, the third portion 100C3 is provided at the distal end portion in the opening direction D1 so as to approach the first leg portion 100B. For this reason, as shown in FIG. 11C, at least two intersection lines between the second plane PL2 (or a plane parallel to the second plane PL2 and passing through an outer edge of the linear portion 100C31) and a surface of the second leg portion 100C are formed. The first intersection line is a first intersection line IL1 between a surface of a connection portion between the third portion 100C3 and the fourth portion 100C4 and the second plane PL2 (or a plane parallel to the second plane PL2 and passing through an outer edge of the linear portion 100C31). The second intersection line is a second intersection line IL2 between a surface of a portion including the linear portion 100C31 and the second plane PL2 (or a plane parallel to the second plane PL2 and passing through an outer edge of the linear portion 100C31). The second intersection line IL2 is separated from the first intersection line IL1 in the direction opposite to the opening direction D1 (in other words, the first intersection line IL1 is separated from the second intersection line IL2 in the opening direction D1). FIG. 11C shows a state in which the connection portion between the third portion 100C3 and the fourth portion 100C4 is slightly distorted by the wall surface GS immediately after the second leg portion 100C and the wall surface GS come into contact with each other at the contact point CP.

As described above, it can be said that the second leg portion 100C includes the linear portion 100C31 that is connected to the other end portion 100A2 of the main body portion 100A and that extends linearly in the opening direction D1, the end portion 100C32 that is displaced in a direction approaching the first leg portion 100B and that is in contact with the tangent plane TP at the contact point CP, and the fourth portion 100C4 that is bent outward from the end portion 100C32 and that extends in the direction opposite to the opening direction D1.

The inventors of the present application focused on the fact that the second leg portion 10C may not be bent in a direction approaching the first leg portion 10B when a binding operation for holding the stem or the like P on the guide element G is attempted by engaging the staple 10 with the guide element G. Accordingly, the inventors conceived of a configuration in which the second leg portion 100C is provided with the end portion 100C32. According to the staple 100, the second leg portion 100C is provided such that the contact point CP is present in the first region AR1 where the first leg portion 100B is present. For this reason, when the staple 100 is moved in the opening direction D1, the second leg portion 100C may be guided to bend in a direction approaching the first leg portion 100B as described below.

[Binding Method of Staple 100]

Hereinafter, a binding method of the staple 100 will be described. FIGS. 12A to 12H are schematic diagrams showing a state in which a process of engaging the staple 100 with the guide element G using the binding machine 110 or manually is viewed from an upper surface (lower side of paper surface in the drawing) and a side surface (upper side of paper surface in the drawing). That is, the staple 100 may be engaged with the guide element G using the binding machine 110, or may be manually engaged with the guide element G when the guide element G is made of a soft material such as a plaster board.

The binding machine 110 includes a pushing portion 110C for moving the staple 100 in a direction substantially corresponding to the opening direction D1. However, the configuration of the binding machine is not limited to the present disclosure. A binding machine having another configuration capable of moving the staple 100 in the opening direction D1 may be used.

Figure 12A:
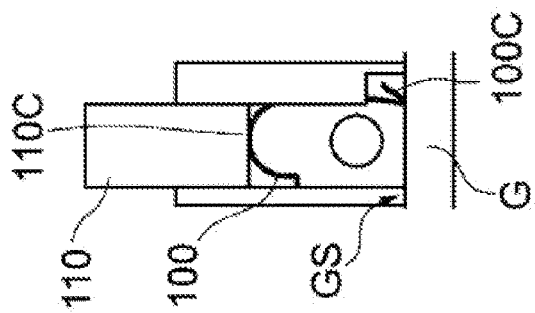
FIG. 12A is a schematic diagram showing a process of engaging the staple according to the modification of the embodiment with a guide element.

FIG. 12A shows an initial state in which the staple 100 is attached to the binding machine 110. The staple 100 is not deformed in this initial state, and thus has the same configuration as that shown in FIGS. 11A to 11C. As shown in the drawing, the main body portion 100A, the first leg portion 100B, and the second leg portion 100C of the staple 100 are provided on the first plane PL in the initial state.

Figure 12B:
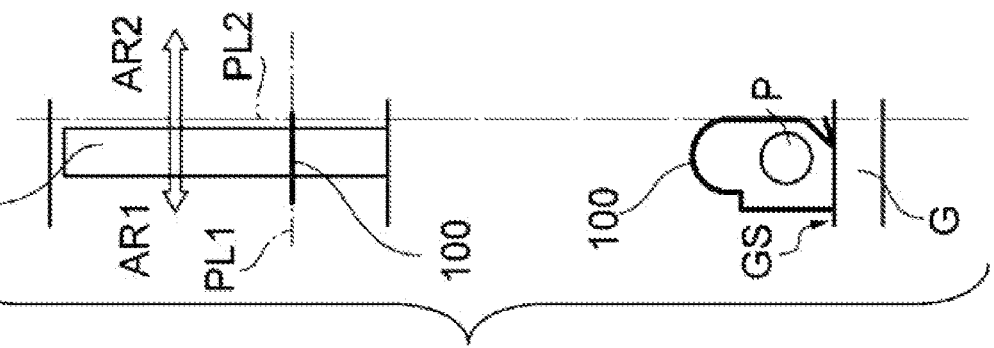
FIG. 12B is a schematic diagram showing a process of engaging the staple according to the modification of the embodiment with a guide element.

Thereafter, binding is started in a state in which the stem or the like P is disposed inside the staple 100 (region surrounded by the main body portion 100A, the first leg portion 100B, and the second leg portion 100C). The stem or the like P and the guide element G extend in substantially the same direction (direction perpendicular to the paper surface). FIG. 12B shows a state in which the staple 100 is moved in the opening direction D1 by using the pushing portion 110C, whereby the distal end of the second leg portion 100C in the opening direction D1 abuts against the wall surface GS of the guide element G, and the second leg portion 100C starts curving.

At this time, the first contact point of the second leg portion 100C with the wall surface GS is the contact point CP corresponding to the distal end of the second leg portion 100C in the opening direction D1. The contact point CP is present in the first region AR1 on the first leg portion 100B side with respect to the second plane PL2 including the straight line SL. For this reason, as shown in FIG. 12B, as the second leg portion 100C advances in the opening direction D1, the end portion 100C32 that receives a force from the linear portion 100C31 is bent in the direction approaching the first leg portion 100B.

On the other hand, the first leg portion 100B is formed to be shorter than the second leg portion 100C, and is separated from the tangent plane TP without intersecting with the tangent plane TP in the initial state (FIG. 11A). For this reason, the first leg portion 100B comes into contact with the wall surface GS after the second leg portion 100C starts to come into contact with the wall surface GS. Accordingly, it is possible to guide the second leg portion 100C to bend in a direction approaching the first leg portion 100B or in a direction in which the opening is closed, before being affected by reaction due to contact of the first leg portion 100B with the wall surface GS. In the present modification, the first leg portion 100B is engaged with the guide element G by being stuck into the wall surface GS. In order to facilitate engagement with the guide element G, the distal end of the first leg portion 100B may be formed to be sharp.

Figure 12C:
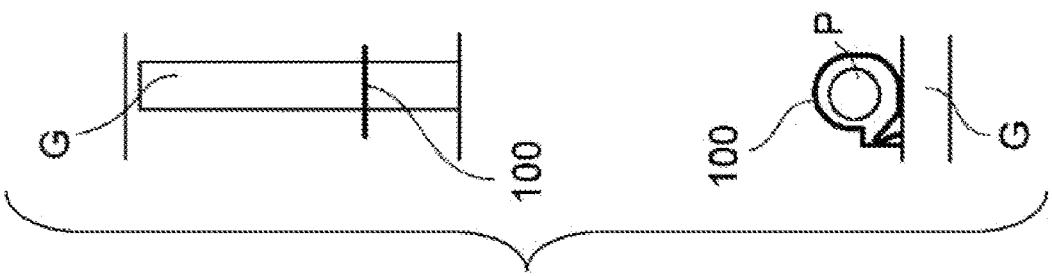
FIG. 12C is a schematic diagram showing a process of engaging the staple according to the modification of the embodiment with a guide element.

When the staple 100 is moved in the opening direction D1 by using the pushing portion 110C of the binding machine 110, the second leg portion 100C is further curved and approaches the first leg portion 100B, and therefore, as shown in FIG. 12C, the second leg portion 100C (vicinity of the connection portion between the third portion 100C3 and the fourth portion 100C4) intersects the first leg portion 100B in a top view. For this reason, the opening provided by the main body portion 100A in the initial state may be closed in the top view.

Figure 12D:
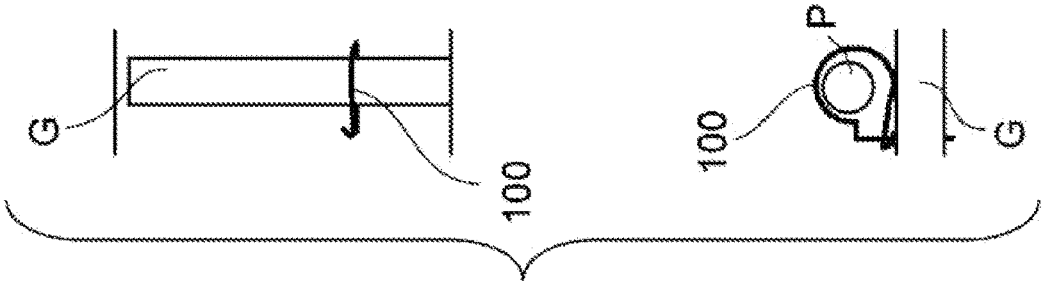
FIG. 12D is a schematic diagram showing a process of engaging the staple according to the modification of the embodiment with a guide element.

FIG. 12D shows a state in which the staple 100 is engaged with the guide element G. At this time, as shown in the drawing, the first leg portion 100B may penetrate the guide element G. The fourth portion 100C4 of the second leg portion 100C is engaged with the first leg portion 100B by being hooked on the first leg portion 100B.

As described above, even when the staple 100 according to the present modification is used, it is possible to hold the stem or the like P by engaging the staple 100 with the guide element G in a state of surrounding the stem or the like P.

Figure 12E:
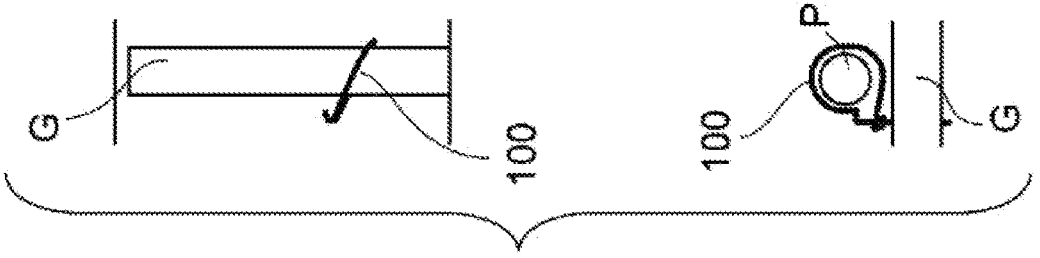
FIG. 12E is a schematic diagram showing a process of engaging the staple according to the modification of the embodiment with a guide element.

FIG. 12E shows a holding state in which the main body portion 100A of the staple 100 is bent to be inclined with respect to an extending direction of the stem or the like P as a modification. In the holding state shown in FIG. 12D, the first plane PL1 including the main body portion 100A is substantially perpendicular to the extending direction of the stem or the like P. However, as shown in FIG. 12E, the staple 100 may be engaged with the guide element G in a state in which the staple 100 is bent such that the plane including the main body portion 100A is inclined with respect to the extending direction of the stem or the like P.

Depending on the shape of the stem or the like P, a gap between the main body portion 100A and the stem like P may be non-uniform. Therefore, the gap between the main body portion 100A and the stem or the like P may be adjusted by bending the staple 100. Here, since the second leg portion 100C is engaged with the first leg portion 100B, the main body portion 100A is easily bent as compared with a case where the second leg portion 100C is fixed to the guide element G.

FIG. 12F shows an example of a holding state in which the fourth portion 100C4 is engaged with the first leg portion 100B using the crank portion of the first leg portion 100B to hold an object to be held. As shown in the drawing, the second leg portion 100C may be engaged with the first leg portion 100B by hooking the fourth portion 100C4 on the first portion 100B1 of the first leg portion 100B.

FIG. 12G shows an example of a holding state in which the distal end of the first leg portion 100B is bent to hold an object to be held. By bending the distal end of the first leg portion 100B, the first leg portion 100B is less likely to come off the wall which is the guide element G. In consideration of such a case, the second portion 100B2 of the first leg portion 100B may be formed to be longer than the third portion 100C3 of the second leg portion 100C.

FIG. 12H shows an example of a holding state in which not only the first leg portion 100B but also the fourth portion 100C4 of the second leg portion 100C is stuck into the wall surface GS of the guide element G to engage the second leg portion 100C with the guide element G and hold an object to be held. A force in a direction to open the opening acts on the fourth portion 100C4 by the elasticity of the curved third portion 100C3. Therefore, the fourth portion 100C4 may be firmly engaged with the wall surface GS when being stuck into the wall surface GS.

As described above, the staple 100 according to the present modification may also be engaged with the guide element G. Further, the second leg portion 100C may be reliably deformed in a direction approaching the first leg portion 100B.

As described above, both the first leg portion 100B and the second leg portion 100C may be engaged with the same guide element G, or the first leg portion 100B may be engaged with the guide element G while the second leg portion 100C may be engaged with the first leg portion 100B instead of the guide element G.

Here, the first leg portion 100B may have a sharp distal end in order to facilitate engagement with the guide element G. The distal end may be formed to be closer to the second leg portion 100C than a center line CL through which a vertex PP passes the center of the second portion 100B2 of the first leg portion 100B. By forming the vertex PP of the distal end in this manner, the second portion 100B2 may be easily deflected in a direction opposite to the position where the stem or the like P is located. Accordingly, the portion of the second portion 100B2, which has a linear shape, may be prevented from deforming or buckling toward a side where the stem or the like P is located.

Even when binding is performed by the binding machine 20 using the staple 10, the distal end of the second portion 10B2 of the first leg portion 10B may be formed to be closer to the second leg portion 10C than the center line CL through which the vertex PP passes the center of the second portion 10B2. By forming the vertex PP of the distal end in this manner, the distal end side of the first leg portion 10B (second portion 10B2) of the staple 10 can be suitably curved or bent by the first deformation portion 20A (clincher portion).

Second Modification of First Embodiment

Hereinafter, a second modification of the staple 10 according to the first embodiment will be described.

Figure 13:
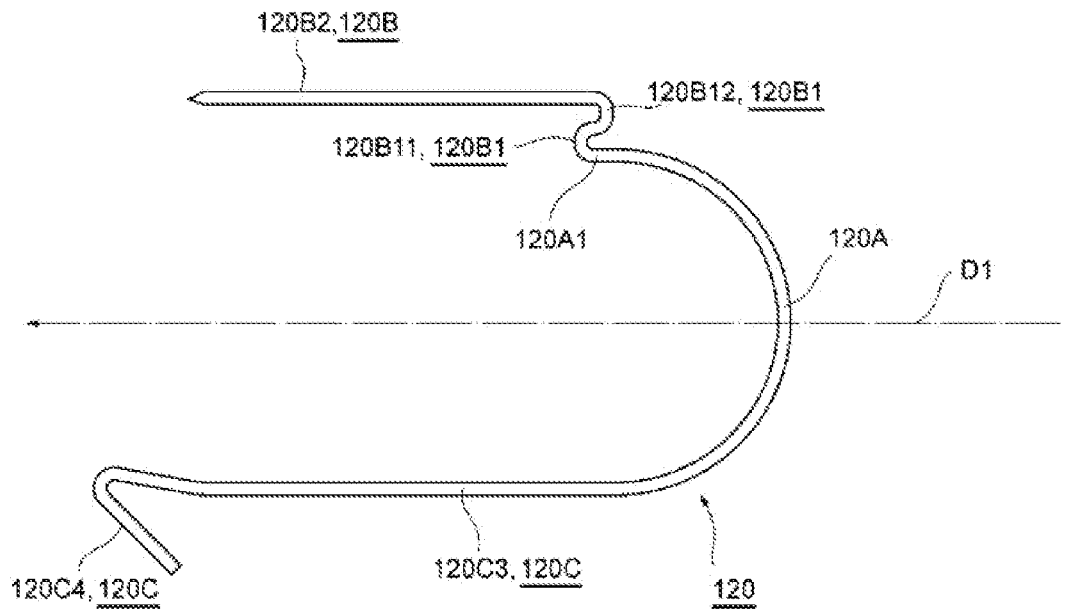
FIG. 13 is a diagram showing an example of a staple according to a modification.

FIG. 13 shows a staple 120 according to a modification of the staple 10. Points having the same configuration as the staple 10 according to the first embodiment are given the same names, description thereof will be omitted or simplified, and different portions will be mainly described.

The staple 120 is common to the staple 10 in that the staple 120 includes a main body portion 120A, a first leg portion 120B continuously extending from one end portion of the main body portion 120A, and a second leg portion 120C continuously extending from the other end portion of the main body portion 120A.

The main body portion 120A has the same configuration as that of the main body portion 10A, and thus description thereof is omitted.

The first leg portion 120B includes a first portion 120B1 that is connected to the one end portion 120A1 of the main body portion 120A, is bent, and extends outward, and a second portion 120B2 that is further bent from the first portion 120B1 and extends in the opening direction D1.

Here, as shown in FIGS. 1 and 13, the first portion 10B1 of the staple 10 and the first portion 120B1 of the staple 120 have different configurations. As shown in FIG. 13, the first portion 120B1 is different from the first portion 10B1 including two bent portions in that the first portion 120B1 includes four bent portions.

That is, as shown in FIG. 1, the first portion 10B1 includes two bent portions, that is, a portion that is bent and connected to the end portion of the main body portion 10A to change the direction outward and a portion that is further bent and connected to the second portion 10B2.

On the other hand, the first portion 120B1 includes four bent portions, that is, a portion that is bent and connected to the end portion 120A1 of the main body portion 120A to change the direction outward, a portion that is further bent to change the direction so as to extend in the direction opposite to the opening direction D1, a portion that is further bent to change the direction outward again, and a portion that is further bent to connect to the second portion 120B2.

Therefore, the first portion 120B1 includes a first portion protruding in the opening direction D1 and a second portion connected to the first portion and protruding in a direction opposite to the opening direction D1.

The configuration of the first portion connecting the main body portion 120A and the second portion 120B2 extending in the opening direction D1 may be variously modified.

For example, compared to the configuration in FIG. 13, a length of a portion extending in the direction opposite to the opening direction D1 may be increased.

Alternatively, the first portion may be formed to be connected to the second portion 120B2 such that a portion advancing outward and a portion advancing in the opening direction D1 are alternately repeated.

Alternatively, the first portion may be formed to extend outward in a direction inclined in a direction opposite to the opening direction D1 and connect to the second portion 120B2. This configuration corresponds to a configuration in which the bending angle α1 is set to an acute angle (for example, 30 degrees to 60 degrees) in the configuration of the first portion 10B1 shown in FIG. 1A.

The staple 100 may be variously modified. For example, the main body portion 100A may not be an arc. A different portion may be provided between the linear portion 100C31 and the end portion 100C32. For example, an extremely short portion may be provided between the linear portion 100C31 and the end portion 100C32 so as to be once displaced outward from the linear portion 100C31 and then connected to the end portion 100C32. Different portions may be provided between the main body portion 100A and the linear portion 100C31. For example, an extremely short portion that is gently curved and connects the main body portion 100A and the linear portion 100C31 may be provided therebetween. Those skilled in the art may modify the staple disclosed in the present application without impairing the gist of the invention.

Third Embodiment

Hereinafter, a staple 200 according to a third embodiment will be described.

The inventors of the present application focused on the fact that, in the case of the staple 50 according to the second embodiment, the main body portion 50A may bite into the stem or the like P depending on the type of the stem or the like P when the stem or the like P grows and comes into contact with the staple 50. Therefore, the inventors of the present application conceived of the configuration of the main body portion 200A that is curved and connect the end portion 200A1 and the end portion 200A2 such that an opening for inserting the stem or the like P, which is an object to be held, is provided between one end portion 200A1 and the other end portion 200A2.

Figure 14:
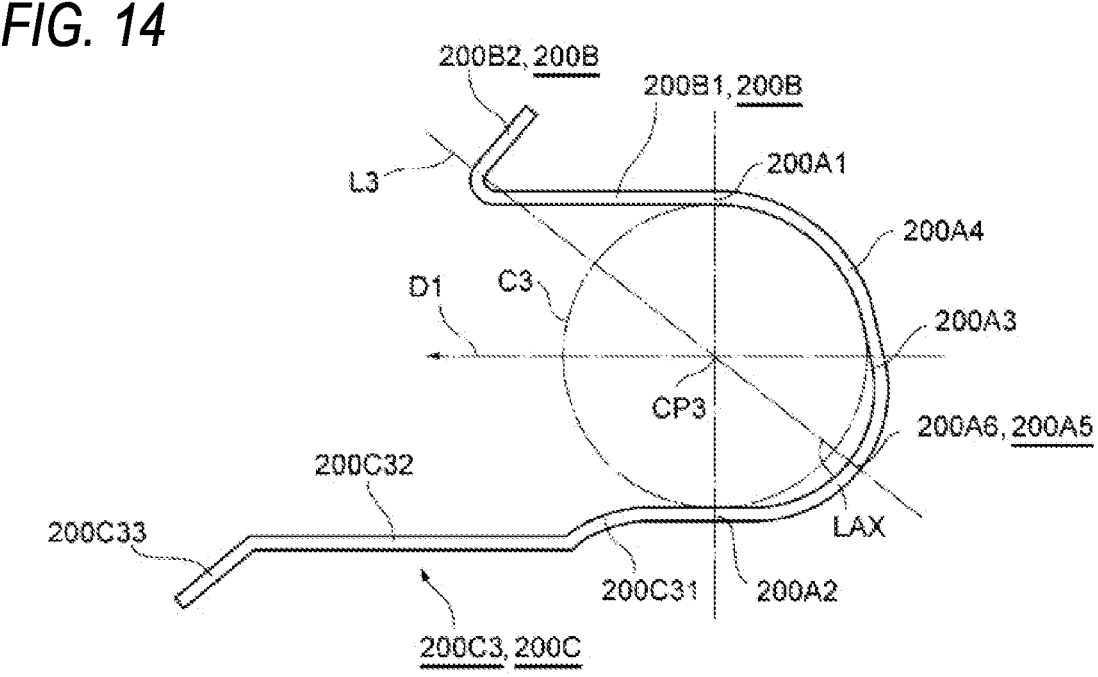
FIG. 14 is a diagram showing an example of a staple according to an embodiment.

FIG. 14 schematically shows the staple 200. As shown in the drawing, the staple 200 includes a first leg portion 200B including a first portion 200B1 that is connected to the one end portion 200A1 and that extends in the opening direction D1 from a middle point 200A3 of the main body portion 200A toward an opening and a second portion 200B2 provided to be bent outward from the first portion 200B1, and a second leg portion 200C including a third portion 200C3 that is connected to the other end portion 200A2 and that extends in the opening direction D1. The first leg portion 200B may be implemented by the second portion 200B2 that bends outward from the one end portion 200A1 of the main body portion 200A, omitting the first portion 200B1.

According to the staple 200, since the main body portion 200A is curved, it is possible to increase a contact area between the staple 200 and the stem or the like P compared to the staple 50. For this reason, the staple 200 may be prevented from biting into the stem or the like P.

Hereinafter, a detailed configuration of the staple 200 will be described. Regarding portions that are the same as or similar to the description relating to the staple according to the other embodiments and thus are understood by those skilled in the art, description thereof will be omitted or simplified, and different portions will be mainly described.

[Main Body Portion]

The main body portion 200A is a portion surrounding the stem or the like P in a bound state (holding state) by inserting the stem or the like P and engaging the staple 200 with the guide element G.

The main body portion 200A according to the present embodiment includes the following configuration in addition to the configuration of being curved so as to be convex in a direction opposite to the opening direction D1. The opening direction D1 is a direction (left direction of the paper surface) from a closed side (right side of the paper surface) to an opening side (left side of the paper surface) of the main body portion 200A. In the configuration according to the present embodiment, more specifically, it can also be said that the opening direction D1 corresponds to a direction from the middle point 200A3 between the one end portion 200A1 and the other end portion 200A2 of the main body portion 200A toward the opening.

The main body portion 200A according to the present embodiment is formed substantially non-symmetrically in an upper half of the paper surface and a lower half of the paper surface. More specifically, the main body portion 200A includes a first main body portion 200A4 that is curved from the vicinity of the middle point 200A3 and connected to the one end portion 200A1, and a second main body portion 200A5 that is curved from the vicinity of the middle point 200A3 and connected to the other end portion 200A2. The second main body portion 200A5 is separated from a virtual inscribed circle C3 inscribed in the staple 200 at an intermediate portion including a middle point 200A6 (example of a "first position on the second main body portion") between the middle point 200A3 and the other end portion 200A2.

Here, the inscribed circle C3 inscribed in the staple 200 is inscribed at, for example, at least the one end portion 200A1 and the other end portion 200A2 of the staple 200. As shown in the drawing, the intermediate portion including the at least middle point 200A6 of the second main body portion 200A5 is formed to have a larger diameter than a circumference of the inscribed circle C3. Therefore, the middle point 200A6 is formed to increase in diameter so as to be separated from the inscribed circle C3 inscribed in the staple 200 at the one end portion 200A1 and the other end portion 200A2 that are separated from the middle point 200A6 with the middle point 200A6 interposed therebetween. In the drawing, in order to clearly express that the middle point 200A6 is separated from the circumference of the inscribed circle C3, a distance therebetween is schematically drawn to be larger than usual.

As a result of such a configuration, as will be described later, the staple 200 may initially bring a portion other than the middle point 200A6 into contact with the stem or the like P, and when the stem or the like P grows, a portion including the middle point 200A6 may come into contact with the stem or the like P. Since the middle point 200A6 is formed to increase in diameter, the stem or the like P that grows and becomes larger may be suitably brought into contact with the middle point 200A6. The position in contact with the grown stem or the like P may be a point other than the middle point 200A6 of the second main body portion 200A5. The inscribed circle may be inscribed in the staple 200 at a point other than the first end portion 200A1 and the second end portion 200A2.

In the present embodiment, the first main body portion 200A4 includes an arc portion having a constant radius. Specifically, the first main body portion 200A4 is formed so as to follow an arc having a central angle of 90 degrees or less than 90 degrees of a circle (corresponding to the inscribed circle C3) whose diameter is a distance between the end portion 200A1 and the other end portion 200A2. For this reason, the first main body portion 200A4 is suitable for holding a stem having a cross section of the inscribed circle C3 or smaller than the inscribed circle C3.

On the other hand, the second main body portion 200A5 is connected to the first main body portion 200A4 in the vicinity of the middle point 200A3, is connected to the second leg portion 200C at the other end portion 200A2, and is provided outside the inscribed circle C3 between the vicinity of the middle point 200A3 and the end portion 200A2. For example, the second main body portion 200A5 is formed in an elliptical arc having a long radius larger than the radius of the inscribed circle C3. Accordingly, the second main body portion 200A5 includes a portion separated from the inscribed circle C3 so that a distance to the virtual inscribed circle C3 increases as the second main body portion 200A5 is separated from the middle point 200A3 and approaches the end portion 200A2, and a portion separated from the inscribed circle C3 so that a distance to the virtual inscribed circle C3 decreases as the second main body portion 200A5 is further separated from the middle point 200A3 and approaches the end portion 200A2. When the entire second main body portion 200A5 is formed in an elliptical arc, the distance between the inscribed circle C3 and the second main body portion 200A is maximum at the middle point 200A6.

As shown in FIG. 14, in the present embodiment, a major axis LAX of the elliptical arc constituting the second main body portion 200A5 is provided on a straight line L3 connecting a center CP3 of the inscribed circle C3 and a connection portion between the first portion 200B1 and the second portion 200B2 of the first leg portion 200B. For this reason, when the staple 200 is engaged with the guide element G in the vicinity of the connection portion between the first portion 200B1 and the second portion 200B2, a position farthest from the guide element G and a position where the distance between the inscribed circle C3 and the second main body portion 200A becomes maximum are both in the vicinity of the middle point 200A6. For this reason, when the main body portion 200A of the staple 200 engaging with the guide element G is inclined along with the growth of the stem or the like P, the stem or the like P may be supported in the vicinity of the middle point 200A6 which is the position farthest from the guide element G. The elliptical arc is an arc when viewed from the inclined direction. For this reason, when at least a part of the second main body portion 200A5 has an elliptical arc, the elliptical arc portion may support the stem or the like P along the cylindrical side surface. Therefore, the stem or the like P may be supported by a longer portion as compared with a case where the stem or the like P is supported by an arc. For this reason, it is possible to provide a staple that is less likely to bite into the stem or the like P than in the related art.

As described later, when the stem or the like P grows, the staple 200 is often used so as to be inclined by 10 degrees to 40 degrees with respect to a horizontal surface. For this reason, the elliptical arc provided at the second main body portion 200A5 is preferably formed such that an inclination angle which is an arc when inclined with a minor axis as a rotation axis is included in a range of 10 degrees or more and 40 degrees or less.

However, the second main body portion 200A5 may have a different curve approximating an elliptical arc instead of the elliptical arc. For example, the second main body portion 200A5 may have an arc portion having a radius smaller than the radius of the inscribed circle C3.

The second main body portion 200A may be formed to have an elliptical arc at a part thereof. For example, a portion intersecting the straight line L3 may be formed as an elliptical arc, and the elliptical arc may be connected to the middle point 200A3 and the end portion 200A2 by smooth curves.

The second main body portion 200A5 may be formed so as to be farthest from the inscribed circle C3 at a portion other than the middle point 200A6 of the second main body portion 200A5. For example, the second main body portion 200A5 may be formed so as to be farthest from the inscribed circle C3 at a position between the middle point 200A6 and the middle point 200A3 or at a position between the middle point 200A6 and the end portion 200A2. For example, when the first portion 200B1 of the first leg portion 200B is longer in the opening direction D1 than the configuration shown in FIG. 14, the connection portion between the first portion 200B1 and the second portion 200B2 is located at a position advanced in the opening direction D1 from that in FIG. 14. For this reason, the second main body portion 200A5 may be formed so as to be farthest from the inscribed circle C3 at a position between the middle point 200A6 and the middle point 200A3, instead of the middle point 200A6. Conversely, for example, when the first portion 200B1 of the first leg portion 200B is formed to be shorter in the opening direction D1 than the configuration shown in FIG. 14, the second main body portion 200A5 may be formed so as to be farthest from the inscribed circle C3 at a position between the middle point 200A6 and the other end portion 200A2.

The main body portion 200A as described above is also applicable to staples other than the staple 200. The configuration of the main body portion 200A described above may be applied to, for example, the staple 100 or the staple 120.

In the main body portion 200A according to the present embodiment, the first main body portion 200A4 and the second main body portion 200A5 are formed non-symmetrically. However, as an aspect of the configuration in which the main body portion 200A is curved, portions corresponding to the first main body portion 200A4 and the second main body portion 200A5 of the main body portion 200A may be symmetrically formed, and for example, the portions may be formed of arcs having the same radius. Further, as an aspect of a configuration in which the main body portion 200A is curved, a portion (or at least a part thereof) corresponding to the first main body portion 200A4 of the main body portion 200A may be formed of an arc having a first radius, and a portion (or at least a part thereof) corresponding to the second main body portion 200A5 may be formed of an arc having a second radius smaller than the first radius. Furthermore, as an aspect of a configuration in which the main body portion 200A is curved, portions corresponding to the first main body portion 200A4 and the second main body portion 200A5 of the main body portion 200A may both be formed of an elliptical arc. For example, an elliptical arc having the major axis LAX as a major axis may be connected to the end portion 200A1 and the end portion 200A2. Alternatively, the elliptical arc constituting the second main body portion 200A5 may extend to at least a part of the first main body portion 200A4. According to this configuration, since a contact area with the stem or the like P is increased as compared with a case of a main body portion formed by connecting line segments, it is also possible to provide a staple capable of preventing biting into the stem or the like P.

[Curved Portion]

Next, a configuration of a curved portion provided at the third portion 200C3 of the second leg portion 200C will be described.

As shown in FIG. 14, in the present embodiment, the third portion 200C3 may include a curved portion 200C31 that is connected to the other end portion 200A2 and that is curved so as to be displaced outward in the opening direction D1, that is, in a direction perpendicular to the opening direction D1 and away from the opening, and an extending portion 200C32 that is bent and connected to the curved portion 200C31 and that extends linearly in the opening direction D1.

According to such a configuration, a connection portion between the curved portion 200C31 and the extending portion 200C32 may be used as a fulcrum for bending the third portion 200C3. For this reason, the connection portion between the curved portion 20C31 and the extending portion 200C32 may be referred to as a bent portion. By providing the bent portion at an intermediate portion of the third portion 200C3, the second leg portion 200C (the third portion 200C3) may be easily bent by a binding machine or manually (by a manual operation of an operator). Since the second leg portion (third portion) may be bent at a fixed position, workability of the binding operation is improved. Since the second leg portion (third portion) has elasticity due to the curved portion 200C31, the second leg portion (third portion) may be prevented from biting into the stem or the like P, and the stem or the like P may be reliably held.

The curved portion 200C31 or the like as described above is also applicable to staples other than the staple 200. The configuration of the curved portion 200C31 or the like may be applied to, for example, the staple 50.

[Distal End Bent Portion]

Next, a configuration of a distal end bent portion provided at the third portion 200C3 of the second leg portion 200C will be described.

As shown in FIG. 14, in the present embodiment, the third portion 200C3 may include a distal end bent portion 200C33 that is connected to the extending portion 200C32 and is displaced outward in the opening direction D1.

According to such a configuration, when the second leg portion 200C (third portion 200C3) is bent by a manual operation, the second leg portion 200C (third portion 200C3) is easily bent by pinching the distal end bent portion 200C33, and thus workability of the binding operation is improved.

The staple 200 according to the present embodiment may support the stem or the like P at different portions in accordance with deformation due to growth of the stem or the like P.

Figure 15A:
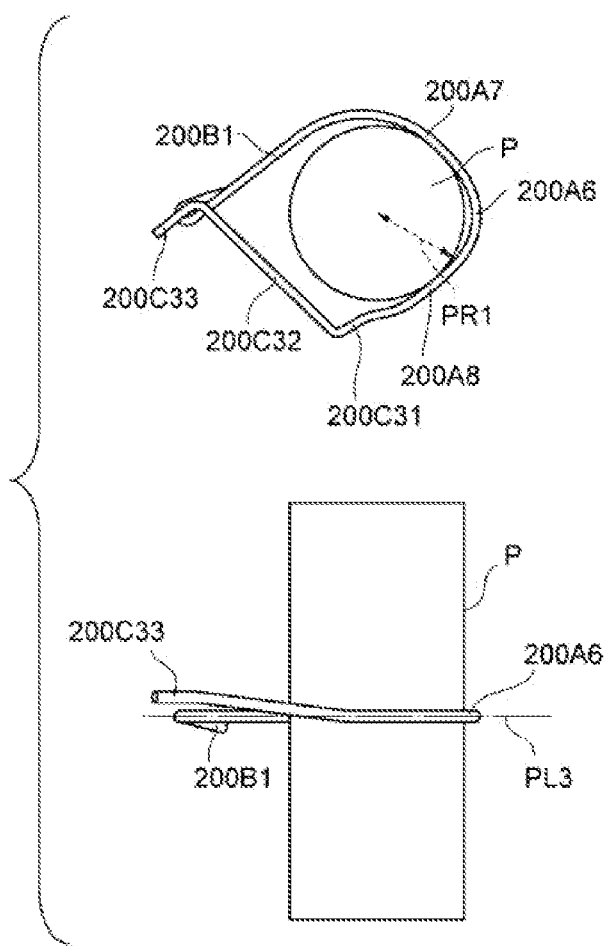
FIG. 15A is a diagram showing a change in a holding posture of the staple according to the embodiment.
Figure 15B:
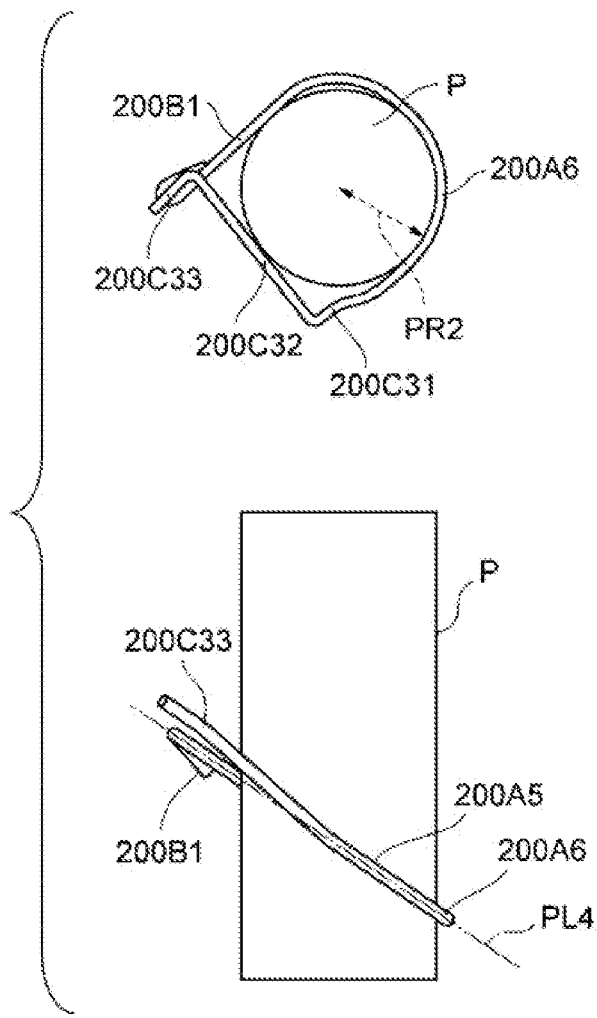
FIG. 15B is a diagram showing a change in the holding posture of the staple according to the embodiment.

FIG. 15A shows a posture of the staple 200 before the growth of the stem or the like P, and FIG. 15B shows a posture of the staple 200 after the growth of the stem or the like P. In the drawings, the stem or the like P and the guide element G (not shown) both extend upward from below (vertical direction). Therefore, lower diagrams of FIGS. 15A and 15B correspond to a side view, and upper diagrams thereof correspond to a top view.

In FIGS. 15A and 15B, the first leg portion 200B and the second leg portion 200C of the staple 200 are engaged with a guide element (not shown). As a means for engaging the staple 200 with the guide element, a binding machine such as the above binding machine 60 (however, when the staple 200 includes the distal end bent portion 200C33, the binding machine 60 may not include the third deformation portion 60C) may be used, or a binding operation may be performed by a manual operation.

In the bound state in which the staple 200 is bound to the guide element, a connection portion between the first portion 200B1 and the second portion 200B2 of the first leg portion 200B is engaged with the guide element similar as shown in FIG. 9A and the like. A connection portion between the distal end bent portion 200C33 and the extending portion 200C32 of the second leg portion 200C is also engaged with the guide element. When the second leg portion 200C does not include the distal end bent portion 200C33, the second leg portion 200C may be engaged with the guide element by bending the distal end of the second leg portion 200C by a manual operation and hooking the second leg portion 200C on the guide element.

The stem or the like P is thin until the stem or the like P sufficiently grows, and thus does not contact the staple 200. When the stem or the like P grows progressively, a part of the stem or the like P comes into contact with the staple 200 as shown in FIG. 15A. In general, a large force does not act on the staple 200 from the stem or the like P until this state is reached. For this reason, a plane PL3 including the main body portion 200A of the staple 200 (penetrating through the main body portion 200A) maintains a state substantially perpendicular to the extending direction of the stem or the like P. In this way, the posture of the staple 200 when the first leg portion 200B and the second leg portion 200C are engaged with the guide element and the plane PL3 including the main body portion 200A (penetrating through the main body portion 200A) is substantially perpendicular to the extending direction of the stem or the like P is referred to as a first holding posture.

When the stem or the like P is located at the center of the staple 200 and grows to have a circular cross section, the stem or the like P is inscribed in the staple 200 when the stem or the like P grows to the size of the virtual inscribed circle C3 in FIG. 14. However, in many cases, since the stem or the like P is not necessarily located at a position deviated from the center of the staple 200 and grows to have a circular cross section, the stem or the like P is inscribed in the staple 200 when the stem or the like P has a cross section smaller than the inscribed circle C3 as shown in FIG. 15A.

Here, the second main body portion 200A5 is formed to increase in diameter so as to have a distance from the center CP3 of the virtual inscribed circle C3 larger than the radius of the inscribed circle C3. More specifically, the second main body portion 200A5 is formed to include an elliptical arc having a long radius larger than the radius of the inscribed circle C3 on the straight line L3. For this reason, in many cases, the staple 200 is inscribed with the stem or the like P at two positions, that is, a region including a contact point 200A7 (example of a "first point") and a region including a contact point 200A8 (example of a "second point") across the middle point 200A6 (before being in contact with the stem or the like P at the middle point 200A6 which is the intersection between the straight line L3 and the second main body portion 200A5).

Assuming that the radius of the stem or the like P at this time is a radius PR1 (example of a "first radius"), it can be said that the side surface of the stem or the like P has a cylindrical surface having the radius PR1. Therefore, the second main body portion 200A5 is formed to include the contact point 200A7 and the contact point 200A8 that are inscribed in a virtual cylindrical surface having the radius PR1, and the middle point 200A6 (example of a "third point") that is located between the two contact points and is separated from the virtual cylindrical surface.

As the stem or the like P grows, the stem or the like P grows into a cylindrical shape having a radius PR2 larger than the radius PR1. As the stem or the like P grows, a weight of the stem or the like P is applied to the staple 200 (including a case where a branch or the like extending in a horizontal direction from the stem or the like P grows and is pressed from above the staple 200, and the staple 200 is pushed down in a vertical direction). Here, since the vicinity of the first leg portion 200B is fixed to the guide element, the main body portion 200A is bent such that a portion including the second main body portion 200A5 which is not fixed to the guide element or the like is lowered in the vertical direction as shown in FIG. 15B. For this reason, a plane PL4 including the main body portion 200A (penetrating through the main body portion 200A) is inclined with respect to the extending direction of the stem or the like P. Here, the second main body portion 200A5 includes a portion formed in an elliptical arc. For this reason, the elliptical arc portion of the second main body portion 200A5 including the middle point 200A6 may support the stem or the like P along the side surface of the stem or the like P which is the cylindrical surface having the radius PR2.

The posture of the staple 200 when the first leg portion 200B and the second leg portion 200C are engaged with the guide element in a state in which the extending direction of the stem or the like P is inclined with respect to the plane PL4 including the main body portion 200A (penetrating through the main body portion 200A) and the middle point 200A6 comes into contact with the stem or the like P due to the main body portion 200A being bent in this way is referred to as a second holding posture.

The staple 200 according to the present embodiment is implemented such that the main body portion 200A has an elliptical arc, focusing on the fact that the staple 200 is more likely to bite into an object to be held when the main body portion 200A is in the second holding posture in which the main body portion 200A is inclined with respect to the horizontal direction due to the weight from the object to be held, rather than in the first holding posture in which the main body portion 200A extends in the substantially horizontal direction. With such a configuration, since it is possible to secure a contact area with the cylindrical surface when the main body portion 200A is inclined, the staple 200 may be prevented from biting into the object to be held.

Further, the staple 200 has elasticity due to the curved portion 200C31. For this reason, when the second leg portion (third portion) is bent at the bent portion and the extending portion 200C32 comes into contact with the stem or the like P, the extending portion 200C32 may be prevented from biting into the stem or the like P.

Fourth Embodiment

The inventors of the present application also studied a cross-sectional structure of a staple capable of preventing biting of the staple. That is, when the staple has a circular cross section, the staple comes into contact with the object to be held at one point on the cross section, and thus the staple easily bites into the object to be held. Further, there is also a possibility that the guide element cannot be engaged with a sufficient holding force. Therefore, a cross-sectional structure of a staple capable of preventing biting into an object to be held and enhancing engagement with a guide element is examined.

Specifically, focusing on the fact that the possibility that a lower end portion of a staple bites into an object to be held increases in the second holding posture in which a main body portion is inclined with respect to a horizontal direction due to a weight from the object to be held, a cross-sectional shape in which a contact area between the staple and the object to be held is increased without increasing a cross-sectional area (that is, without increasing a material cost), as compared with a staple having a circular cross section in the related art, at the lower end portion when the staple is inclined is examined.

Further, the inventors of the present application conceived of a configuration in which a shape of an inner side surface that comes into contact with the object to be held and a shape of an outer side surface that does not come into contact with the object to be held are differed, and the cross section of the staple is formed non-symmetrically. Specifically, the present inventors conceived of a configuration in which a contact area, with a portion to be held, of the inner side surface of the staple that comes into contact with the object to be held is increased, and a friction surface, with the guide element, of the outer side surface of the staple engaged with the guide element is increased.

The cross-sectional structure of the staple will be described below. The cross-sectional structure of the staple shown in the present embodiment may also be applied to any staple disclosed in the present application.

The inventors of the present application conceived of a configuration having a cross-sectional shape in which a thickness of the staple in an upper-lower direction is increased and a width of the staple in a left-right direction is reduced as a configuration for increasing the contact area between the staple in the second holding posture and the object to be held while maintaining the same cross-sectional area as that of the circular cross section in the related art.

Figure 16A:
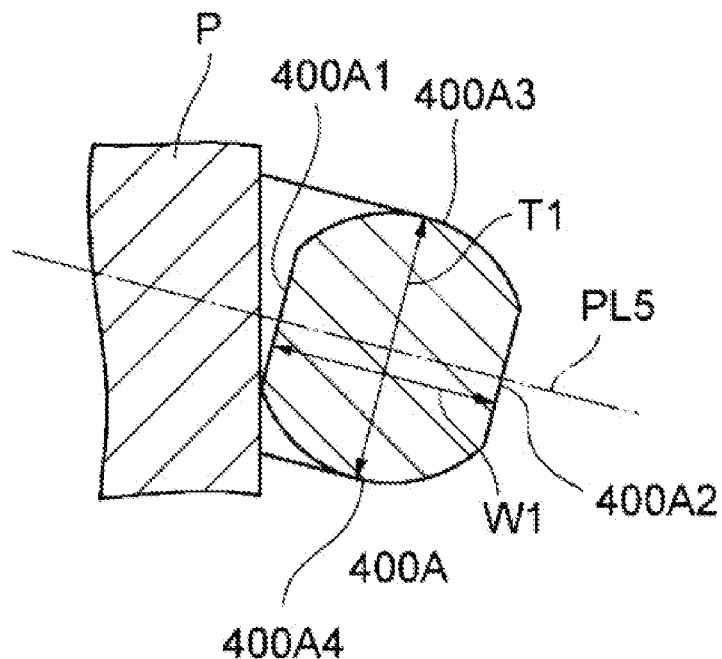
FIG. 16A is a diagram showing a cross-sectional configuration of a staple according to an embodiment.

FIG. 16A shows an example of a staple 400A having such a configuration, and shows a cross-sectional diagram in which the staple 400A is cut along a cross section perpendicular to an extending direction in the vicinity of a lower end portion when being inclined by 15 degrees in the second holding posture.

As shown in the drawing, the staple 400A includes, in the cross section, a side portion 400A1 in which an end portion on a left side of the paper surface corresponding to an inner side surface side extends linearly in the upper-lower direction, and a side portion 400A2 in which an end portion on a right side of the paper surface corresponding to an outer side surface side extends linearly in the upper-lower direction. The end portions in the upper-lower direction includes an upper end portion 400A3 and a lower end portion 400A4 that are rounded and that connect upper ends and lower ends of the side portions 400A1 and 400A2, respectively.

Here, the upper-lower direction refers to a direction perpendicular to a plane PL5 passing through the first leg portion, the second leg portion, and the main body portion, and the left-right direction refers to a direction parallel to the plane PL5. Since the staple 400A is inclined by 15 degrees with respect to the horizontal plane in the drawing, the plane PL5 is also inclined by 15 degrees with respect to the horizontal plane.

The staple 400A has a thickness T1 in the upper-lower direction perpendicular to the plane PL5 and a width W1 in the left-right direction parallel to the plane PL5 in the cross section. Here, as compared with a diameter D1 of a virtual circle having the same cross-sectional area as the cross-sectional area of the staple 400A, the thickness T1 is larger than the diameter D1, and the width W1 is smaller than the diameter D1.

The inventors of the present application confirmed that when the surface of the stem or the like P is slightly moved to a staple 400A side so that the staple 400A bites into the surface of the stem or the like P which is an object to be held in the drawing, a contact area between the surface of the stem or the like P and the staple 400A is larger than that in the case of a circular cross section.

Therefore, according to the staple 400A having the cross section in FIG. 16A, it is possible to increase the contact area between the staple and the object to be held and to prevent the biting of the staple as compared with the case of having a circular cross section.

Figure 16B:
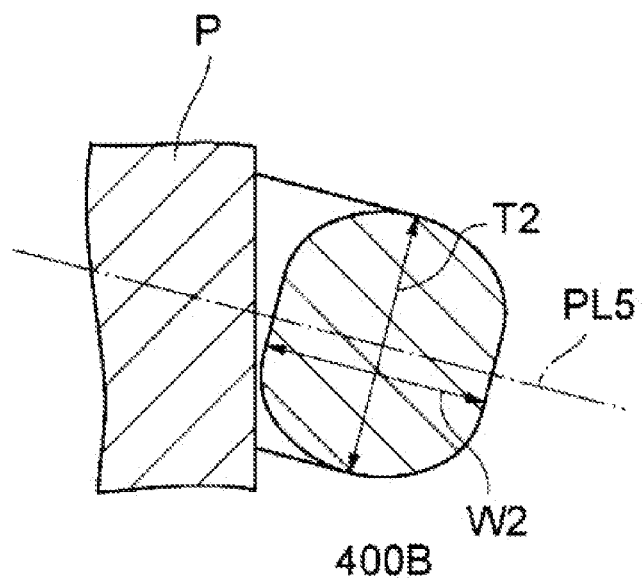
FIG. 16B is a diagram showing a cross-sectional configuration of a staple according to the embodiment.

FIG. 16B shows an example of a staple 400B having such a configuration, and similarly shows a cross-sectional diagram in which the staple 400B is cut along a cross section perpendicular to an extending direction in the vicinity of a lower end portion when being inclined by 15 degrees in the second holding posture.

As shown in the drawing, the staple 400B includes two side portions and an upper end portion and a lower end portion connecting the two side portions as in the staple 400A, but is different from the staple 400A in which the side portion, the upper end portion, and the lower end portion have edges and are connected to one another in that the side portion, the upper end portion, and the lower end portion are connected so as to be rounded.

The staple 400B has a thickness T2 in the upper-lower direction perpendicular to the plane PL5 and a width W2 in the left-right direction parallel to the plane PL5 in the cross section. Here, as compared with a diameter D1 of a virtual circle having the same cross-sectional area as a cross-sectional area of the staple 400B, the thickness T2 is larger than the diameter D1, and the width W2 is smaller than the diameter D1.

It is also confirmed that in such a staple 400B, a contact area between the surface of the stem or the like P and the staple 400B is large as compared with the case of a circular cross section.

Figure 16C:
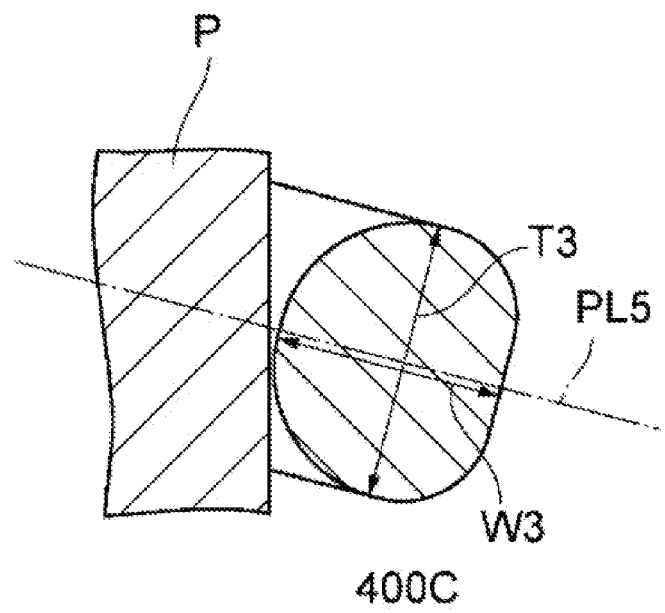
FIG. 16C is a diagram showing a cross-sectional configuration of a staple according to the embodiment.

FIG. 16C shows a staple 400C having a configuration which is formed such that a contact area between a portion to be held and an inner side surface of the staple that comes into contact with the object to be held is increased, and a friction surface between the guide element and an outer side surface of the staple engaged with the guide element is increased.

As shown in the drawing, in the cross section, an inner surface side of the staple 400C includes an elliptical arc portion whose major axis is the upper-lower direction, and an outer surface side of the staple 400C includes a linear portion extending in the upper-lower direction. Further, the staple includes a cross section including an upper end portion connecting an upper end of the elliptical arc portion and an upper end of the linear portion, and a lower end portion connecting a lower end of the elliptical arc portion and a lower end of the linear portion. Here, as compared with a curvature of the elliptical arc portion, the linear portion extending in the upper-lower direction is made longer by reducing R (curvature radius) connecting the upper end portion and the lower end portion to the linear portion. For example, R is less than half a thickness T3.

The staple 400C may include an inner side surface which is connected to at least one or both of the upper end portion and the lower end portion at R which is half or more of the thickness T3 in the cross section. The staple may further include an outer side surface which is connected to at least one or both of the upper end portion and the lower end portion at R which is less than half of the thickness T3. According to such a configuration, since a straight portion on the outer surface side may be made long, a frictional resistance with the guide element such as a string may be increased. In addition, since a contact area with an object to be held may be increased as compared with the case of a circular cross section on the inner side surface side, biting into the object to be held may be prevented.

The staple 400C has the thickness T3 in the upper-lower direction perpendicular to the plane PL5 and a width W3 in the left-right direction parallel to the plane PL5 in the cross section. Here, as compared with a diameter D1 of a virtual circle having the same cross-sectional area as a cross-sectional area of the staple 400C, the thickness T3 is larger than the diameter D1, and the width W3 is smaller than the diameter D1.

It is also confirmed that in such a staple 400B, a contact area between the surface of the stem or the like P and the staple 400B is large as compared with the case of a circular cross section. In addition, by providing a linear portion on the outer side, it is possible to increase a friction surface with a guide element and to enhance engagement with the guide element.

As described above, by adopting a staple having the cross section shown in the present embodiment, it is possible to provide a staple which prevents biting of an object to be held and is hardly detached from the guide element.

In addition, the staple disclosed in the present application may be variously modified by those skilled in the art exhibiting ordinary creativity. For example, the staple may have a portion that exhibits different functions and is not described in the present application between a certain portion and another portion. The configuration shown in an embodiment may be applied to the configuration shown in another embodiment. For example, the cross-sectional configuration shown in the fourth embodiment may be provided to the staple shown in the first embodiment.

As described above, the present application discloses the following matters.

(1) A staple capable of holding a stem or a branch of a plant on a guide element, the staple being made of a wire having flexibility, the staple including:
  a main body portion with one side being opened;
  a first leg portion continuously extending from one end portion of the main body portion on an opening side; and
  a second leg portion continuously extending from the other end portion of the main body portion on the opening side, in which
  the first leg portion includes a first portion bent and extending outward and a second portion bent from the first portion and extending in an opening direction,
  the second leg portion includes a third portion extending in the opening direction and a fourth portion bent outward from a distal end portion of the third portion, and
  the third portion is formed to be longer than the second portion.

(2) The staple according to (1), in which
  the third portion is formed to be longer than a distance between the one end portion and the other end portion of the main body portion.
(3) The staple according to (1), in which
  the second portion and the third portion are formed to be substantially parallel to each other.
(4) The staple according to any one of (1) to (3), in which
  an angle between the first portion and the main body portion is an acute angle.
(5) The staple according to (4), in which
  an angle between the first portion and the main body portion is 90 degrees or about 90 degrees.
(6) The staple according to any one of (1) to (5), in which
  the main body portion includes a portion curved in a C shape.
(7) The staple according to any one of (1) to (5), in which
  the main body portion includes a portion formed in a rectangular shape.
(8) The staple according to any one of (1) to (5), in which
  the main body portion includes a portion formed in a parallelogram shape.
(9) The staple according to any one of (1) to (5), in which
  the main body portion includes a first side portion extending linearly in the opening direction and including the one end portion, a second side portion including the other end portion and extending substantially parallel to the first side portion, and a third side portion connecting the first side portion and the second side portion and extending linearly.
(10) The staple according to (9), in which
  the third side portion forms an obtuse angle with the first side portion and forms an acute angle with the second side portion.
(11) A staple being made of a wire having flexibility and capable of holding a stem or a branch of a plant on a guide element, the staple including:
  a main body portion with one side being opened;
  a first leg portion continuously extending from one end portion of the main body portion on an opening side; and
  a second leg portion continuously extending from the other end portion of the main body portion on the opening side, in which
  the first leg portion includes a first portion bent and extending outward,
  the second leg portion includes a third portion extending in the opening direction, and
  the main body portion has
  at least three contact points circumscribing a virtual inscribed circle, and includes
  a first side portion extending in a tangent direction of the inscribed circle at a first contact point on a side closer to the first leg portion,
  a second side portion extending substantially parallel to the first side portion in a tangent direction of the inscribed circle at a second contact point on a second leg portion side, and
  a third side portion extending in a tangent direction of the inscribed circle at a third contact point between the first contact point and the second contact point.
(12) The staple according to (11), in which
  the third side portion forms an obtuse angle with the first side portion and forms an acute angle with the second side portion, and
  the third portion is formed to be longer than a distance between the one end portion and the other end portion of the main body portion.

(13) The staple according to (11) or (12), in which
the first leg portion further includes a second portion bent from the first portion and extending substantially parallel to the third portion.

(14) A staple made of a wire having flexibility and capable of holding a stem or a branch of a plant on a guide element by being deformed by a binding machine including a first deformation portion that curves or bends one distal end side of the wire and a second deformation portion that curves or bends a predetermined portion of the wire to move the other distal end side of the wire toward the one distal end side, the staple including:
a main body portion with one side being opened;
a first leg portion continuously extending from one end portion of the main body portion on an opening side; and
a second leg portion continuously extending from the other end portion of the main body portion on the opening side and including a bent portion that is bent outward on a distal end side, in which
the first leg portion includes a first portion bent and extending outward and a second portion bent from the first portion and extending in an opening direction, the second portion being curved or bent so that a distal end side thereof surrounds the guide element by the first deformation portion, thereby holding the guide element,
the second leg portion includes a third portion extending in the opening direction and curved or bent by the second deformation portion, thereby engaging the bent portion with the guide element in a state in which a stem or a branch of the plant is located in the staple.

(15) A staple capable of holding a stem or a branch of a plant on a guide element by being deformed by a binding machine including a first deformation portion that curves or bends one distal end side of the wire, a second deformation portion that curves or bends a predetermined portion of the wire to move the other distal end side of the wire toward the one distal end side, and a third deformation portion that curves or bends outward a portion closer to the other distal end side than the predetermined portion, the staple being made of a wire having flexibility, the staple including:
a main body portion with one side being opened;
a first leg portion continuously extending from one end portion of the main body portion on an opening side; and
a second leg portion continuously extending from the other end portion of the main body portion on the opening side, in which
the first leg portion includes a first portion bent and extending outward and a second portion bent from the first portion and extending in an opening direction, and is curved or bent so that a distal end side thereof surrounds the guide element by the first deformation portion, thereby holding the guide element,
the second leg portion includes a third portion and a fourth portion, the third portion extending in the opening direction and being curved or bent inward by the second deformation portion, the fourth portion extending in the opening direction and being curved or bent outward by the third deformation portion, thereby being engaged with the guide element in a state in which a stem or a branch of the plant is located in the staple.

(16) A binding method for holding a stem or a branch of a plant on a guide element, the binding method including:
a step of attaching a staple to a binding machine,
the staple being made of a wire having flexibility and including
a main body portion with one side being opened,
a first leg portion continuously extending from one end portion of the main body portion on an opening side, and
a second leg portion continuously extending from the other end portion of the main body portion on the opening side, in which
the first leg portion includes a first portion bent and extending outward and a second portion bent from the first portion and extending in an opening direction, and
the second leg portion includes a third portion extending in the opening direction and a fourth portion bent outward from a distal end portion of the third portion,
the binding machine including
a first deformation portion that curves or bends one distal end side of a wire, and
a second deformation portion that curves or bends a predetermined portion of the wire to move the other distal end side of the wire toward the one distal end side;
a step of moving a distal end side of the second leg portion in a direction toward the first leg portion using the second deformation portion of the binding machine in a state in which the stem or the branch is located in a region surrounded by the first leg portion, the second leg portion, and the main body portion;
a step of holding the guide element by curving or bending a distal end side of the first leg portion of the staple using the first deformation portion of the binding machine so as to surround the guide element; and
a step of engaging the fourth portion with the guide element to apply a tension to the guide element in a direction away from the first leg portion.

(17) A binding method for holding a stem or a branch of a plant on a guide element, the binding method including:
a step of attaching a staple to a binding machine,
the staple being made of a wire having flexibility and including
a main body portion with one side being opened,
a first leg portion continuously extending from one end portion of the main body portion on an opening side, and
a second leg portion continuously extending in an opening direction from the other end portion of the main body portion on the opening side, in which
the first leg portion includes a first portion bent and extending outward and a second portion bent from the first portion and extending in the opening direction,
the binding machine including
a first deformation portion that curves or bends one distal end side of a wire,
a second deformation portion that curves or bends a predetermined portion of the wire to move the other distal end side of the wire toward the one distal end side, and
a third deformation portion that curves or bends a portion closer to the other distal end side than the predetermined portion in a direction away from the one distal end side;
a step of forming a fourth portion by using the second deformation portion of the binding machine to curve or bend a predetermined portion of the second leg portion of the staple and move a distal end side of the second leg portion in a direction toward the first leg portion and by using the third deformation portion of the binding machine to curve or bend a portion closer to the distal end side of the second leg portion than the predetermined portion in a state in which the stem or the branch is located in a region surrounded by the first leg portion, the second leg portion, and the main body portion;

a step of holding the guide element by curving or bending the distal end side of the second portion of the first leg portion of the staple using the first deformation portion of the binding machine so as to surround the guide element; and a step of engaging the fourth portion with the guide element to apply a tension to the guide element in a direction away from the first leg portion.

(18) The binding method according to (16), in which in a step of curving or bending so as to surround the guide element, the distal end side of the first leg portion is curved or bent in a first circumferential direction around the guide element so as to surround the guide element, and in a step of engaging the bent portion to the guide element, the fourth portion bent in the first circumferential direction about the guide element is engaged with the guide element.

(19) The binding method according to (17), in which in a step of curving or bending so as to surround the guide element, the distal end side of the first leg portion is curved or bent in a second circumferential direction around the guide element so as to surround the guide element, and in the step of engaging the fourth portion to the guide element, the bent portion bent in a first circumferential direction opposite to the second circumferential direction about the guide element is engaged with the guide element.

(20) The binding method according to (17) or (18), in which in a step of moving the distal end side of the second leg portion in a direction toward the first leg portion, the distal end side of the second leg portion is moved in a direction toward the first leg portion while being moved in a direction away from a plane including the main body portion.

(21) A staple being made of a wire having flexibility and capable of holding a stem or a branch of a plant on a guide element, the staple including:

a main body portion that is curved and with one side being opened;

a first leg portion continuously extending from one end portion of the main body portion on an opening side; and a second leg portion continuously extending from the other end portion of the main body portion on the opening side, in which the first leg portion includes a first portion bent and extending toward an outer side of the opening and a second portion bent from the first portion and extending linearly in a direction in which the opening is closed, the second portion being curved or bent to surround the guide element on a distal end side, thereby holding the guide element, in which the second leg portion includes a third portion and a fourth portion, the third portion including a portion that is bent and linearly extends in a direction in which the opening is closed, the fourth portion being bent outward from a distal end portion of the third portion to apply a tension in a direction away from the first leg portion and engage with the guide element.

(22) A staple that is made of a wire having flexibility and holds a stem or a branch of a plant on a guide element, the staple including:

a main body portion;

a first leg portion continuously extending from one end portion of the main body portion; and a second leg portion continuously extending from the other end portion of the main body portion, in which the first leg portion includes a second portion that extends linearly in a direction in which an opening is closed and that is curved or bent to surround the guide element on a distal end side, thereby holding the guide element, the second leg portion includes a third portion and a fourth portion, the third portion including a portion that is bent and linearly extends in a direction in which the opening is closed, the fourth portion being bent outward from a distal end portion of the third portion to apply a tension in a direction away from the first leg portion and engage with the guide element, and the main body portion includes a first side portion extending linearly from the first leg portion, a second side portion extending linearly from the second leg portion substantially parallel to the first side portion, and a third side portion that forms an obtuse angle with the first side portion and forms an acute angle with the second side portion, thereby connecting the first side portion and the second side portion.

(23) The staple according to any one of (1) to (10), in which the third portion includes a fifth portion extending linearly in the opening direction and a sixth portion located between the fifth portion and the distal end portion, and the sixth portion is bent toward the first leg portion with respect to the fifth portion.

(24) The staple according to any one of (1) to (10), in which the third portion includes a linear portion extending linearly in the opening direction and the distal end portion, and a contact point between the second leg portion and a tangent plane is present in a first region where the first leg portion is present, the tangent plane being perpendicular to a straight line passing through a center of the linear portion and being in contact with the second leg portion, and the first region being one of two regions partitioned by a second plane that is perpendicular to a first plane passing through the first leg portion and the second leg portion and includes the straight line.

(25) The staple according to (24), in which a portion including the distal end portion is bent with respect to the linear portion so as to be displaced toward a first region side, the fourth portion is bent with respect to the portion including the distal end portion so as to be displaced toward a second region where the first leg portion is not present, the second region being another of the two regions partitioned by the second plane.

(26) The staple according to (24) or (25), in which
the first leg portion is separated from the tangent plane.

(27) The staple according to any one of (23) to (26), in which
a vertex of a distal end of the second portion in the opening direction is formed to be closer to the second leg portion than a straight line passing through a center of the second portion.

(28) A staple that is made of a wire having flexibility and that causes a guide element to hold an object to be held such as a stem or a branch of a plant, the staple including:
a main body portion that is curved so that an opening for inserting the object to be held is provided between two end portions to connect one of the end portions and the other end portion;
a first leg portion engaged with the guide element and including a first portion and a second portion, the first portion being connected to the one end portion of the main body portion and extending in an opening direction toward the opening from a middle point of the main body portion, the second portion being bent outward from the first portion; and
a second leg portion engaged with the guide element and including a third portion that is connected to the other end portion of the main body portion and that extends in the opening direction.

(29) The staple according to (28), in which
the main body portion includes a first main body portion curved from vicinity of the middle point and connected to the one end portion, and a second main body portion curved from the vicinity of the middle point and connected to the other end portion, and
the second main body portion is separated from a virtual inscribed circle at a first position on the second main body portion, the virtual inscribed circle being inscribed in the staple at at least two contact points separated from the first position and sandwiching the first position therebetween.

(30) The staple according to (29), in which
the inscribed circle is inscribed in the staple at at least the one end portion and the other end portion,
the first main body portion includes an arc portion formed of an arc having the same radius as the inscribed circle, and
the second main body portion includes an elliptical arc portion formed of an elliptical arc having a long radius larger than a radius of the inscribed circle.

(31) The staple according to (30), in which
a major axis of the elliptical arc is present on a straight line passing through a center of the inscribed circle and a connection portion between the first portion and the second portion.

(32) The staple according to (28) or (29), in which
the third portion includes a curved portion that is curved so as to be displaced outward as advancing in the opening direction, and an extending portion that is bent and connected to the curved portion and extends linearly in the opening direction.

(33) The staple according to (32), in which
the third portion includes a distal end bent portion connected to the extending portion and displaced outward as advancing in the opening direction.

(34) The staple according to any one of (28) to (33), in which
in a cross section perpendicular to an extending direction of the staple,
a thickness of the staple in an upper-lower direction perpendicular to a first plane passing through the first leg portion, the second leg portion, and the main body portion is larger than a diameter of a virtual circle having the same cross-sectional area as a cross-sectional area of the staple, and
a width of the staple in a left-right direction parallel to the first plane passing through the first leg portion and the second leg portion is smaller than the diameter of the virtual circle having the same cross-sectional area as the cross-sectional area of the staple.

(35) A staple that is made of a wire having flexibility and that causes a guide element to hold an object to be held such as a stem or a branch of a plant, the staple including:
a main body portion including a curved portion that is curved so that an opening for inserting the object to be held is provided between two end portion and that connects one of the end portions and the other end portion;
a first leg portion that is connected to the one end portion of the main body portion to be engaged with the guide element; and
a second leg portion that is connected to the other end portion of the main body portion to be engaged with the guide element, in which
the main body portion has a first point, a second point, and a third point, the first point being inscribed on a virtual first cylindrical surface inscribed in the staple, the virtual first cylindrical surface having a central axis perpendicular to a first plane passing through the first leg portion and the second leg portion and having a first radius, the second point being inscribed on the first cylindrical surface, and the third point being located between the first point and the second point and separated from the first cylindrical surface, and
the staple is configured to take
a first holding posture in which the object to be held is surrounded in a state in which an extending direction of the object to be held is substantially perpendicular to a plane including the main body portion, and the first leg portion and the second leg portion are engaged with the guide element, and
a second holding posture in which the main body portion is bent by the grown object to be held, whereby an extending direction of the object to be held is inclined with respect to a plane including the main body portion, the object to be held is surrounded in a state in which the third point is in contact with the object to be held, and the first leg portion and the second leg portion are engaged with the guide element.

The present application is based on Japanese Patent Application No. 2020-183166 filed on Oct. 30, 2020 and Japanese Patent Application No. 2021-166024 filed on Oct. 8, 2021, and the contents are incorporated by reference herein.

REFERENCE SIGNS LIST

10: staple 10A: main body portion 10A1: end portion 10A2: end portion 10B: first leg portion 10B1: first portion 10B2: second portion 10C: second leg portion 10C3: third portion 10C4: fourth portion 20: binding machine 20A: first deformation portion 20B: second deformation portion 20C: pushing portion 50: staple 50A: main body portion 50A1: first side portion 50A2: second side portion 50A3: third side portion 50A4: end portion 50A5: end portion 50B: first leg portion 50C: second leg portion 50C3: third portion 50C4: fourth portion 60: binding machine 500: staple structure

The invention claimed is:

1. A staple capable of holding a stem or a branch of a plant on a guide element, the staple being made of a wire having flexibility, the staple comprising:
    a main body portion formed to be curved in a C shape or an arc shape, or to be a rectangular shape to open in a first direction, the main body portion comprising a first end portion extending in the first direction, and a second end portion opposite the first end portion, the second end portion extending in the first direction;
    a first leg portion continuously extending from the first end portion of the main body portion;
    and a second leg portion continuously extending from the second end portion of the main body portion, wherein
    the first leg portion includes a first portion bent and extending outward from the first end portion and a second portion bent from a distal end portion of the first portion and extending in the first direction,
    the second leg portion includes a third portion extending from the second end portion in the first direction and a fourth portion bent outward of the third portion such that the fourth portion is disposed at a side of the third portion away from the opening, from a distal end portion of the third portion,
    the third portion is longer than the second portion, the third portion includes a fifth portion extending linearly in the first direction from the second end portion and a sixth portion located between the fifth portion and the distal end portion,
    the sixth portion is bent toward the first leg portion with respect to the fifth portion, and
    the second portion and the third portion extend substantially parallel to each other.

2. The staple according to claim 1, wherein
the third portion is longer than a distance between the first end portion and the second end portion of the main body portion.

3. The staple according to claim 1, wherein
an angle between the first portion and the main body portion is 90 degrees or less.

4. The staple according to claim 1, wherein
the main body portion includes a portion curved in a C shape.

5. The staple according to claim 1, wherein
a vertex of a distal end of the second portion in the first direction is formed closer to the second leg portion than a straight line passing through a center of the second portion.

6. A staple capable of holding a stem or a branch of a plant on a guide element, the staple being made of a wire having flexibility, the staple comprising:
    a main body portion opening in a first direction;
    a first leg portion continuously extending from a first end portion that is one of ends of the main body portion on an opening side; and
    a second leg portion continuously extending from a second end portion that is another of the ends of the main body portion on the opening side, wherein
    the first leg portion includes a first portion bent and extending outward and a second portion bent from the first portion and extending in the first direction,
    the second leg portion includes a third portion extending in the first direction and a fourth portion bent outward from a distal end portion of the third portion,
    the third portion is longer than the second portion,
    the third portion includes a fifth portion which is a linear portion extending linearly in the first direction and the distal end portion,
    at least a part of the fourth portion is disposed on a first side of a straight line extending through a center of the fifth portion, and wherein the first leg portion is disposed on a second side of the straight line opposite the first side,
    a contact point between the second leg portion and a tangent plane is present in a first region, corresponding to the second side of the straight line, where the first leg portion is present, the tangent plane being perpendicular to the straight line and being in contact with the second leg portion, and the first region being one of two regions partitioned by a second plane that is perpendicular to a first plane passing through the first leg portion and the second leg portion and includes the straight line,
    a portion including the distal end portion is bent with respect to the linear portion to be displaced toward the first region, and
    the fourth portion is bent to be displaced toward a second region with respect to the portion including the distal end portion, the second region corresponding to the first side of the straight line and being one of the two regions partitioned by the second plane where the first leg portion is not present.

7. The staple according to claim 6, wherein
the first leg portion is separated from the tangent plane.

8. The staple according to claim 6, wherein
a vertex of a distal end of the second portion in the first direction is formed closer to the second leg portion than a straight line passing through a center of the second portion.

9. The staple according to claim 6, wherein
the third portion is longer than a distance between the first end portion and the second end portion of the main body portion.

10. The staple according to claim 6, wherein
the second portion and the third portion extend substantially parallel to each other.

11. The staple according to claim 6, wherein
an angle between the first portion and the main body portion is 90 degrees or less.

12. The staple according to claim 6, wherein
the main body portion includes a portion curved in a C shape.

13. A staple for a binding machine including a first deformation portion configured to curve or bend one distal end side of the wire and a second deformation portion configured to curve or bend a predetermined portion of the wire to move another distal end side of the wire toward the one distal end side, the staple being capable of holding a stem or a branch of a plant on a guide element and made of a wire having flexibility, the staple comprising:
    a main body portion formed to be curved in a C shape or an arc shape, or to be a rectangular shape to open in a first direction, the main body portion comprising one end portion extending in the first direction, and another end portion opposite the one end portion, the another end portion extending in the first direction;
    a first leg portion continuously extending from the one end portion of the main body portion; and a second leg portion continuously extending from the another end portion of the main body portion and including a bent portion that is bent outward on a distal end side, wherein the first leg portion includes a first portion bent and extending outward and a second portion bent from the first portion and extending in the first direction, the second portion being curved or bent by the first deformation portion so that a distal end side thereof surrounds the guide element, thereby holding the guide element, and the second leg portion includes a third portion extending in the first direction and curved or bent by the second deformation portion, thereby engaging the bent portion with the guide element in a state in which the stem or the branch of a plant is located in the staple, and the second portion and the third portion extend substantially parallel to each other.

* * * * *